US012617213B2

(12) United States Patent
Yoshida

(10) Patent No.: US 12,617,213 B2
(45) Date of Patent: May 5, 2026

(54) LIQUID SUPPLY APPARATUS AND LIQUID APPLICATION APPARATUS

(71) Applicant: Tomofumi Yoshida, Kanagawa (JP)

(72) Inventor: Tomofumi Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 176 days.

(21) Appl. No.: 18/389,806

(22) Filed: Dec. 20, 2023

(65) Prior Publication Data

US 2024/0217244 A1 Jul. 4, 2024

(30) Foreign Application Priority Data

Dec. 28, 2022 (JP) ................................ 2022-211980
Nov. 6, 2023 (JP) ................................ 2023-189683

(51) Int. Cl.
*B41J 2/175* (2006.01)

(52) U.S. Cl.
CPC ................................ *B41J 2/17596* (2013.01)

(58) Field of Classification Search
CPC ...... B41J 2/17596; B41J 2/17556; B41J 2/17; B41J 2/175; B41J 2/18
See application file for complete search history.

(56) References Cited

U.S. PATENT DOCUMENTS 5,451,987 A 9/1995 Perrin
2008/0117240 A1* 5/2008 Sheinman ............ B41J 2/17596 347/89
2010/0327025 A1* 12/2010 Yokoyama ........... B41J 2/14145 347/7
2018/0250946 A1* 9/2018 Nakamura ........... B41J 2/17596
(Continued)

FOREIGN PATENT DOCUMENTS

CN 104428137 A 3/2015
CN 108501529 A 9/2018
(Continued)

OTHER PUBLICATIONS

Extended European Search Report issued Apr. 4, 2024 in European Patent Application No. 23218124.8, 12 pages.
(Continued)

*Primary Examiner* — Shelby L Fidler
*Assistant Examiner* — Tracey M McMillion
(74) *Attorney, Agent, or Firm* — XSENSUS LLP

(57) ABSTRACT

A liquid supply apparatus includes a compressed air supply source, a pressurizing tank, a feeder, a discharge head, a mitigation device, and a circulation path. The compressed air supply source compresses air. The feeder feeds liquid accumulated in the pressurizing tank to a liquid flow path. The discharge head includes an internal flow path through which the liquid fed from the liquid flow path flows. The discharge head has a nozzle to discharge the liquid from the internal flow path. The mitigation device is installed on the liquid flow path at a position downstream from the pressurizing tank and upstream from the discharge head, and absorbs a fluctuation in pressure of the liquid flowing through the liquid flow path. In the circulation path, the feeder circulates the liquid in the liquid flow path in an order of the pressurizing tank, the mitigation device, the discharge head, and the pressurizing tank.

20 Claims, 18 Drawing Sheets

(56) References Cited

U.S. PATENT DOCUMENTS

| | | | | |
|---|---|---|---|---|
| 2019/0092034 | A1* | 3/2019 | Goto | B41J 2/175 |
| 2019/0105918 | A1 | 4/2019 | Cholewik et al. | |
| 2022/0081016 | A1* | 3/2022 | Suhling | B62B 1/12 |
| 2022/0274420 | A1* | 9/2022 | Hozumi | B41J 2/18 |

FOREIGN PATENT DOCUMENTS

| | | | |
|---|---|---|---|
| CN | 108528046 | A | 9/2018 |
| CN | 114302772 | A | 4/2022 |
| CN | 216704764 | U | 6/2022 |
| JP | 2004-142382 | A | 5/2004 |
| JP | 2004-202797 | A | 7/2004 |
| JP | 2006-281532 | A | 10/2006 |
| JP | 2011-025565 | A | 2/2011 |
| JP | 2011-051204 | A | 3/2011 |
| JP | 2012-000819 | A | 1/2012 |
| JP | 2015-020161 | A | 2/2015 |
| JP | 2020-163839 | A | 10/2020 |

OTHER PUBLICATIONS

Office Action issued Feb. 9, 2026 in Chinese Patent Application No. 202311672418.2, 9 pages.

* cited by examiner

NO ACCUMULATOR

NO ACCUMULATOR (PRESSURE)

NO ACCUMULATOR (FLOW RATE)

WITH ACCUMULATOR

WITH ACCUMULATOR (PRESSURE)

WITH ACCUMULATOR (FLOW RATE)

LIQUID SUPPLY APPARATUS AND LIQUID APPLICATION APPARATUS

CROSS-REFERENCE TO RELATED APPLICATIONS

This patent application is based on and claims priority pursuant to 35 U.S.C. § 119(a) to Japanese Patent Application No. 2022-211980, filed on Dec. 28, 2022, and Japanese Patent Application No. 2023-189683, filed on Nov. 6, 2023, in the Japan Patent Office, the entire disclosure of each of which is hereby incorporated by reference herein.

BACKGROUND

Technical Field

Embodiments of the present disclosure relate to a liquid supply apparatus and a liquid discharge apparatus.

Related Art

In an ink supply apparatus that supplies ink and the like, as typified by an inkjet, in order to convey a high-viscosity ink having a large amount of solid components and high settleability in a dispersed state, a technology that relates to an operation is known (which, hereinafter, may be referred to as flow-through) in which the ink is conveyed by being circulated by taking, as part of the flow path, a liquid chamber for the ink in the discharge head. In addition, as technology for discharging a high-viscosity ink (of about 1000 mPa·s, for example) that cannot be discharged by a normal inkjet method, an airless spray is known for which a high pressure is applied to the ink and the ink is vigorously discharged from a spray gun tip hole to atomize and coat the ink.

Where the above-described inkjet technology is concerned, in the case of a technology using hydraulic head pressure, it is difficult to convey the high-viscosity ink by circulating same because the circulation structure is under a pressure close to atmospheric pressure. If the conveyance through circulation cannot be performed, there is advancement of ink separation and precipitation, an abnormal image caused by a drop in ink concentration and discharge failure due to nozzle clogging caused by ink solid precipitate occur, and there is a problem that the ink cannot be blown over a distance by using a fluctuating pressure under meniscus control. Furthermore, in the case of an airless spray, there is a problem that, although high-viscosity ink can be discharged over a distance, there is advancement of ink separation and precipitation due to a structure in which the high-viscosity ink cannot flow through the discharge head, and discharge failure occurs due to an abnormal image caused by a drop in ink concentration, nozzle clogging caused by ink solid precipitate, and the like.

As such inkjet technology, a configuration is disclosed that includes a degassing unit and wherein a differential pressure is provided between a filling tank upstream of a discharge head and a drain tank downstream thereof to produce flow-through, and in order to supply ink to both tanks so that the ink in the filling tank and the drain tank is not depleted even if large droplets are discharged, a configuration in which, in a case where the ink in the filling tank or the drain tank is depleted, a state where the ink constantly flows through in the discharge head is maintained while a flow path is switched by an electromagnetic valve or the like so that a main tank and the filling tank or the drain tank communicate with each other is implemented using one pump.

SUMMARY

To solve the above-described problem and achieve the above-described object, according to an embodiment of the present disclosure, a liquid supply apparatus includes a compressed air supply source, a pressurizing tank, a feeder, a discharge head, a mitigation device, and a circulation path. The compressed air supply source compresses air. The pressurizing tank is supplied with the compressed air from the compressed air supply source and accumulates liquid pressurized by the compressed air. The feeder feeds the liquid accumulated in the pressurizing tank to a liquid flow path. The discharge head includes an internal flow path through which the liquid fed from the liquid flow path flows. The discharge head has a nozzle to discharge the liquid from the internal flow path. The mitigation device is installed on the liquid flow path at a position downstream from the pressurizing tank and upstream from the discharge head. The mitigation device absorbs a fluctuation in pressure of the liquid flowing through the liquid flow path. In the circulation path, the feeder circulates the liquid in the liquid flow path in an order of the pressurizing tank, the mitigation device, the discharge head, and the pressurizing tank.

According to another embodiment of the present disclosure, a liquid application apparatus includes a liquid supply apparatus, a carrying device, and a support. The liquid supply apparatus discharges liquid onto an installation surface. The carrying device moves the liquid supply apparatus. The support supports the liquid supply apparatus. The liquid supply apparatus includes a compressed air supply source, a pressurizing tank, a feeder, a discharge head, a mitigation device, and a circulation path. The compressed air supply source compresses air. The pressurizing tank is supplied with the compressed air from the compressed air supply source and accumulates liquid pressurized by the compressed air. The feeder feeds the liquid accumulated in the pressurizing tank to a liquid flow path. The discharge head includes an internal flow path through which the liquid fed from the liquid flow path flows. The discharge head has a nozzle to discharge the liquid from the internal flow path. The mitigation device is installed on the liquid flow path at a position downstream from the pressurizing tank and upstream from the discharge head. The mitigation device absorbs a fluctuation in pressure of the liquid flowing through the liquid flow path. In the circulation path, the feeder circulates the liquid in the liquid flow path in an order of the pressurizing tank, the mitigation device, the discharge head, and the pressurizing tank.

BRIEF DESCRIPTIONS OF THE DRAWINGS

A more complete appreciation of embodiments of the present disclosure and many of the attendant advantages and features thereof can be readily obtained and understood from the following detailed description with reference to the accompanying drawings, wherein.

Figure 17:
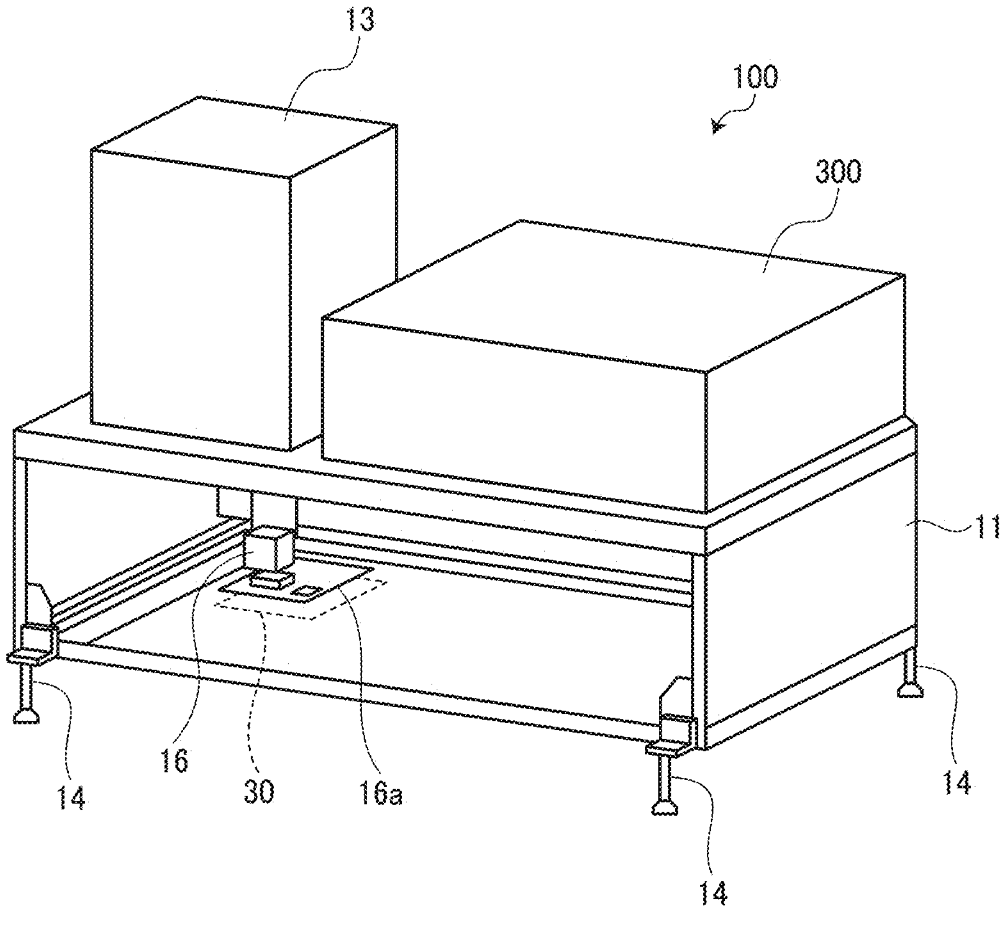
Figure 18:
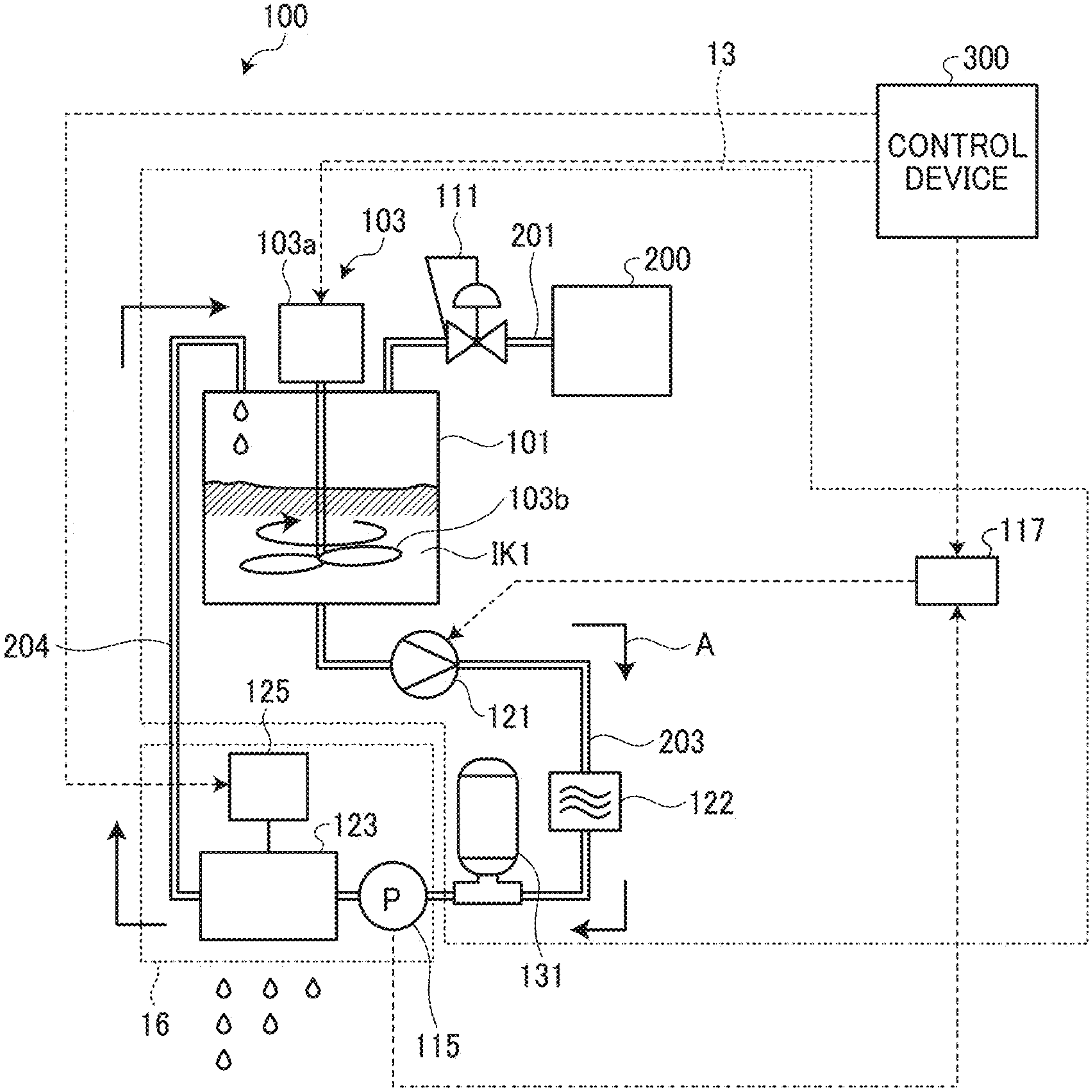
Figure 19:
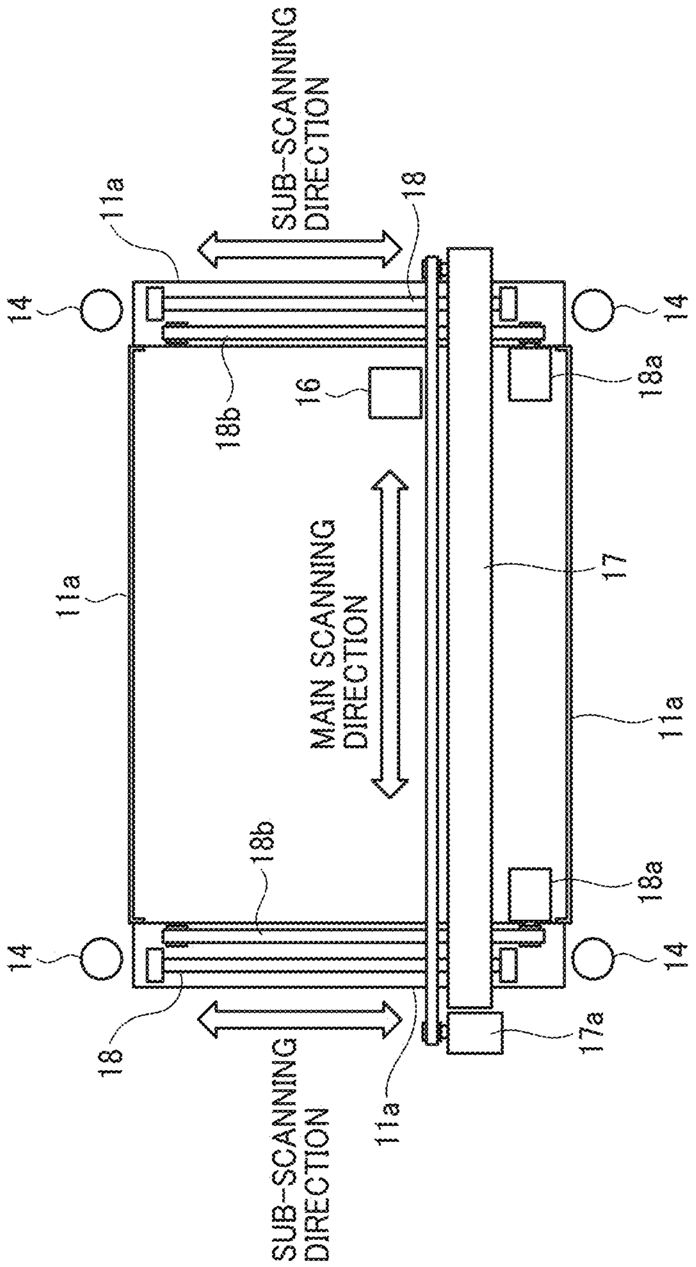

FIG. 17 is an external view of the liquid application apparatus according to the seventh embodiment with a carriage of a printing device placed at a maintenance position, FIG. 18 is a diagram illustrating a configuration of an ink supply apparatus installed to the liquid application apparatus according to the seventh embodiment; and FIG. 19 is a diagram illustrating a configuration of a moving mechanism of the carriage of the liquid application apparatus according to the seventh embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an.” and “the” are intended to include the plural forms as well, unless the context clearly indicates otherwise.

Hereinafter, embodiments of a liquid supply apparatus according to embodiments of the present invention will be described in detail with reference to the drawings. In addition, the present disclosure is not limited by the following embodiments, and constituent elements in the following embodiments include those that can be easily conceived by those skilled in the art, those that are substantially the same, and those within a so-called equivalent range. Various omissions, substitutions, changes, and combinations of constituent elements can be made without departing from the gist of the following embodiments.

Hereinafter, a liquid supply apparatus according to embodiments of the present disclosure will be described in detail with reference to the drawings. The present disclosure, however, is not limited to the following one or more embodiments, and the constituent elements of the following one or more embodiments include elements that may be easily conceived by those skilled in the art, those being substantially the same ones, and those being within equivalent ranges. Various omissions, substitutions, changes, and combinations of constituent elements can be made without departing from the gist of the following embodiments.

First Embodiment Configuration of Ink Supply Apparatus

Figure 1:
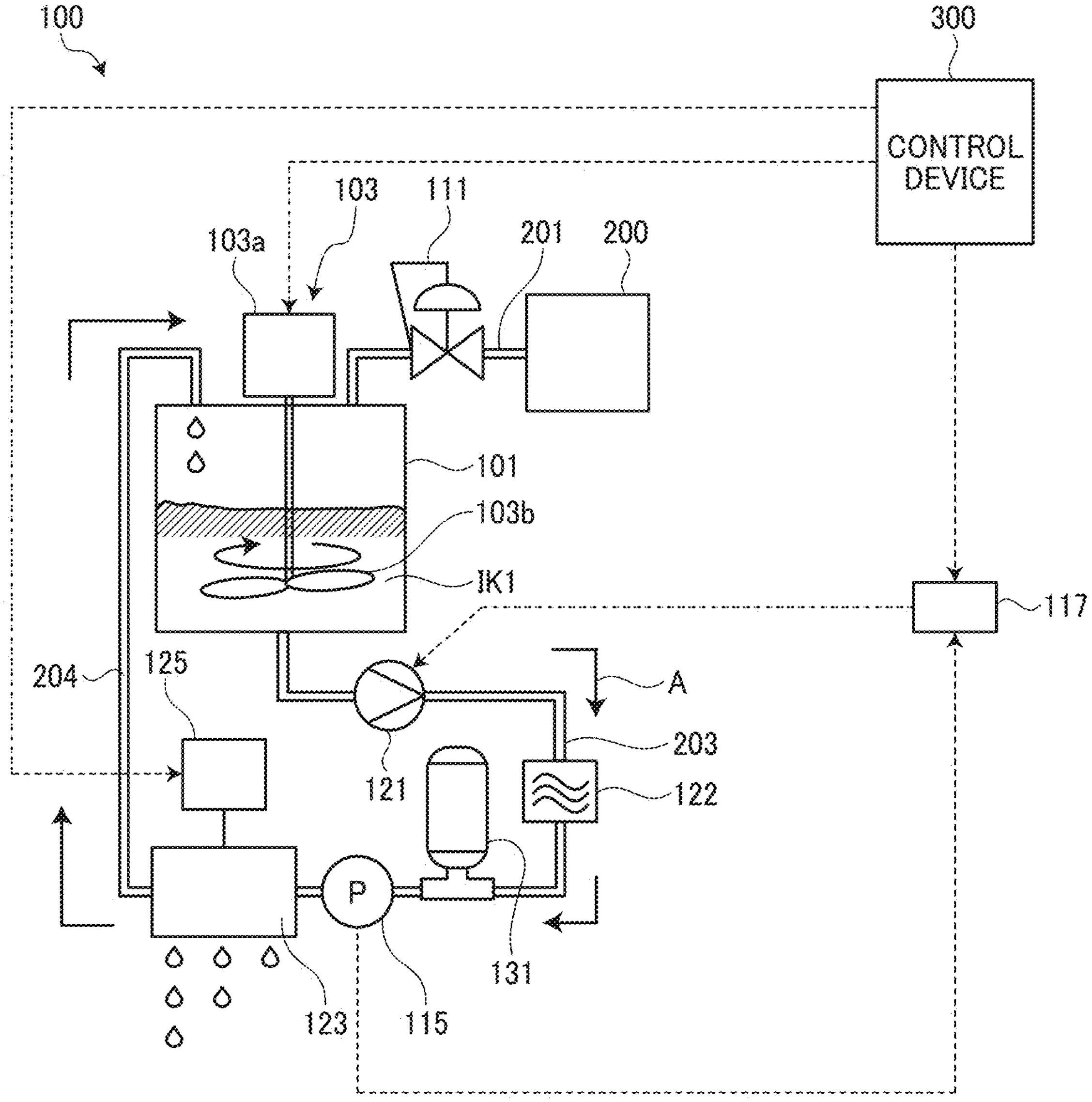
FIG. 1 is a diagram illustrating a configuration of an ink supply apparatus according to a first embodiment of the present disclosure.
Figure 2A:
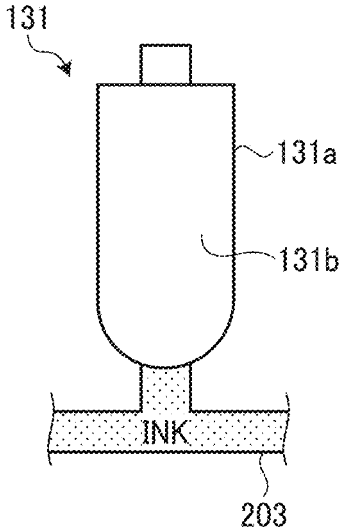
FIGS. 2A to 2C are diagrams each illustrating a structure of an accumulator of the ink supply apparatus according to the first embodiment.
Figure 2B:
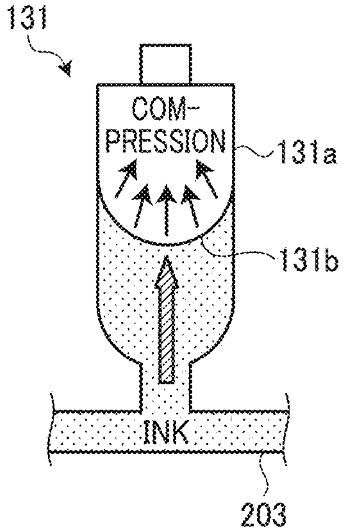
Figure 2C:
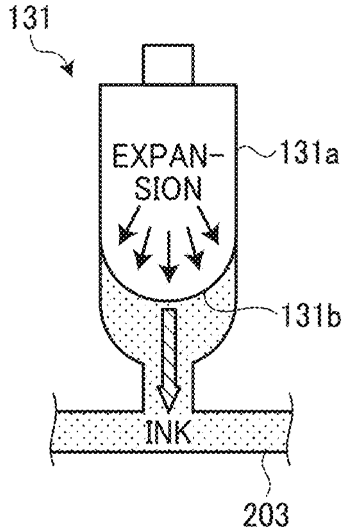
Figure 3A:
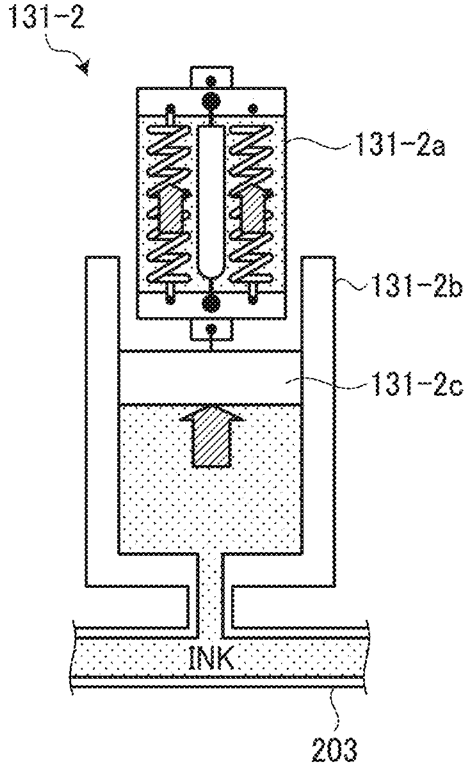
FIGS. 3A and 3B are diagrams each illustrating a structure of a piston pressing mechanism that can be substituted for an accumulator of the ink supply apparatus according to the first embodiment.
Figure 3B:
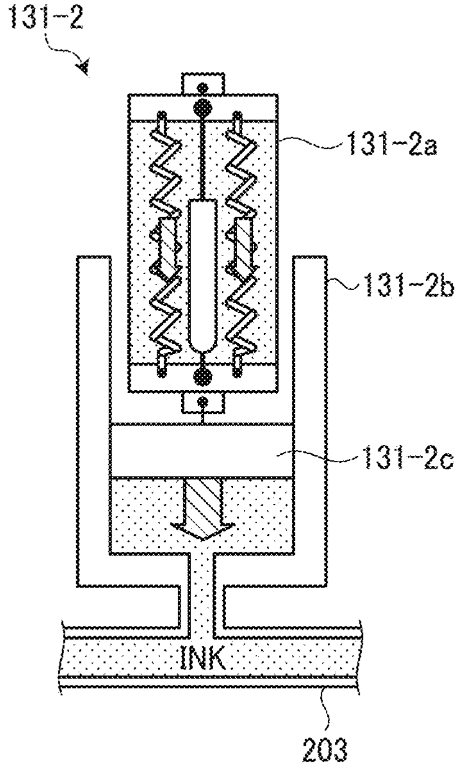
Figure 4A:
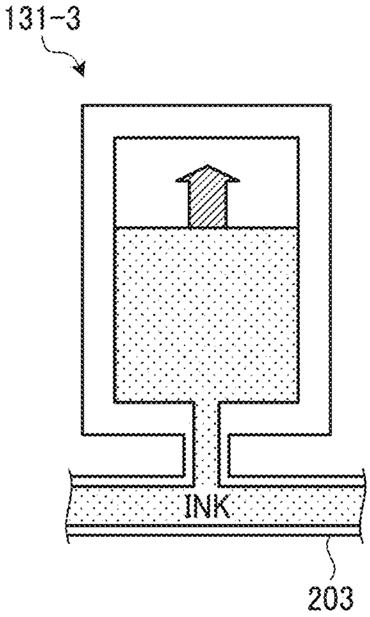
FIGS. 4A and 4B are diagrams each illustrating a structure of a subtank that can be substituted for the accumulator of the ink supply apparatus according to the first embodiment.
Figure 4B:
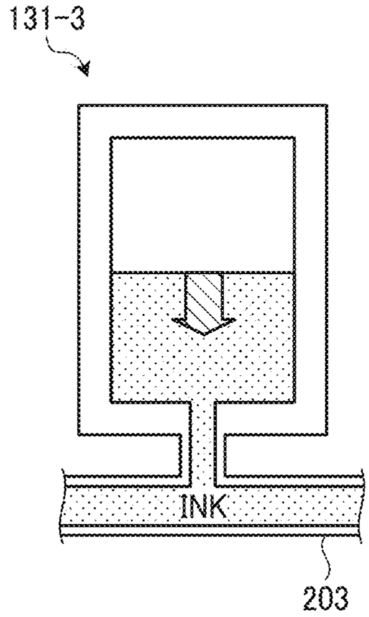

FIG. 1 is a diagram illustrating a configuration of an ink supply apparatus according to a first embodiment of the present disclosure. FIGS. 2A to 2C are diagrams each illustrating a structure of an accumulator of the ink supply apparatus according to the first embodiment. FIGS. 3A and 3B are diagrams each illustrating a structure of a piston pressing mechanism that can be substituted for the accumulator of the ink supply apparatus according to the first embodiment. FIGS. 4A and 4B are diagrams each illustrating a structure of a subtank that can be substituted for the accumulator of the ink supply apparatus according to the first embodiment. A configuration of an ink supply apparatus 100 according to the present embodiment will be described with reference to FIGS. 1 to 4B.

The ink supply apparatus 100 (an example of a liquid supply apparatus) is an apparatus for forming an image on a print medium by discharging a high-viscosity ink (hereinafter, the ink is sometimes referred to as high-viscosity ink or simply ink) from a discharge head 123 while causing the high-viscosity ink, which is a non-Newtonian fluid having thixotropy, to flow through. Note that, in the present embodiment, the ink will be described as an example, but the present invention can be generally applied to a high-viscosity liquid which is a non-Newtonian fluid having thixotropy.

As illustrated in FIG. 1, the ink supply apparatus 100 includes a high-pressure air supply source 200 (compressed air supply source), a regulator 111, a pressurizing tank 101, a stirring device 103, a pump 121 (an example of a feeder), a filter 122, an accumulator 131 (an example of a first mitigation device), a pressure gauge 115, a discharge head 123, a nozzle open-close control device 125, a pressure control device 117 (first control device), and a control device 300.

The high-pressure air supply source 200 is coupled to the pressurizing tank 101 via an air supply path 201, and is an air supply source for sending high-pressure air compressed by a compressor or the like to the pressurizing tank 101. The high-pressure air supply source 200 sends, for example, air compressed to a pressure equal to or greater than atmospheric pressure to the pressurizing tank 101.

The regulator 111 is a regulator device that is installed on the air supply path 201 and that reduces the pressure of the high-pressure air supplied from the high-pressure air supply source 200 to a given pressure. That is, the regulator 111 adjusts the pressure of the air supplied from the air supply path 201 to a given pressure greater than atmospheric pressure and lower than the pressure of the air compressed by the high-pressure air supply source 200, and uses the air at that pressure to pressurize an ink IK1, which is the high-viscosity ink with which the pressurizing tank 101 is filled. Adjustment of the pressure reduction by the regulator 111 is performed manually, for example.

The pressurizing tank 101 is a tank filled with the ink IK1, which is a high-viscosity ink. The air supply path 201 is coupled to an upper portion of the pressurizing tank 101. The compressed air that is sent from the high-pressure air supply source 200 and passes through the regulator 111 is supplied into the pressurizing tank 101 to pressurize the ink IK1 in the pressurizing tank 101. Furthermore, an ink flow path 203 (an example of a liquid flow path) that enables the ink IK1 to flow out is coupled to a lower portion of the pressurizing tank 101, and the ink flow path 203 is coupled to the discharge head 123. That is, the ink flow path 203 which is a "liquid flow path" indicates a flow path through which the ink flowing out from the pressurizing tank 101 flows into the discharge head 123.

Note that the pressurizing tank 101 may include, for example, a water level gauge for measuring the fill amount of the ink IK1, an ink temperature controller such as a heater or a cooler for managing the viscosity of the ink IK1, a thermometer for managing and controlling the temperature of the ink IK1, and the like.

The stirring device 103 is a device for stirring the ink IK1 with which the pressurizing tank 101 is filled. The stirring device 103 includes a stirring motor 103*a* and a stirrer 103*b*.

The stirring motor 103*a* is a motor device for stirring the ink IK1 by rotationally driving the stirrer 103*b*. The on/off operation of the rotation of the stirring motor 103*a* is controlled by the control device 300.

The stirrer 103*b* is a stirring member that rotates under the rotation of the stirring motor 103*a* to stir the ink IK1.

Figure 5:
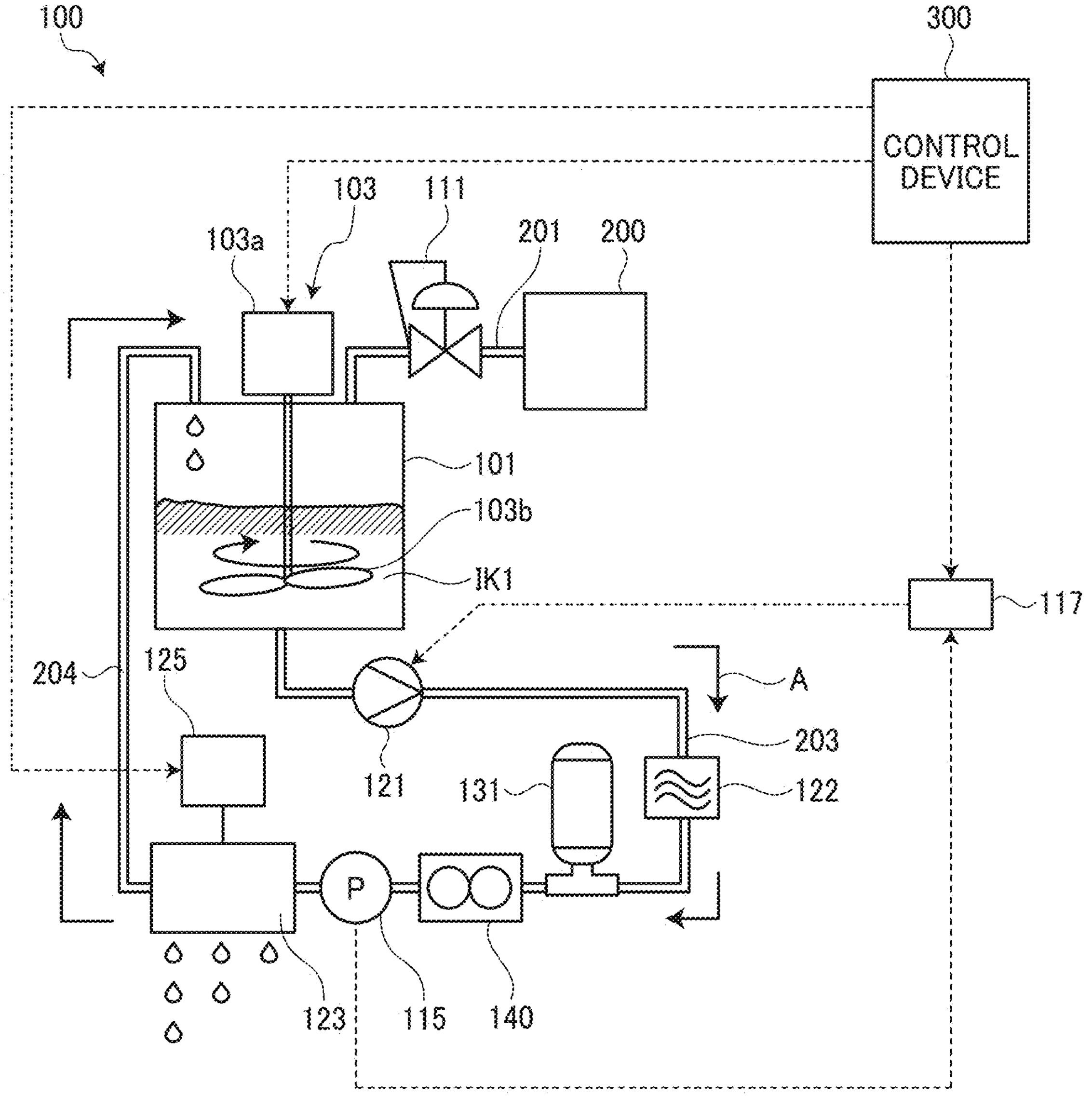
FIG. 5 is a diagram illustrating a configuration for measuring a pressure and a flow rate of ink flowing into a discharge head in the ink supply apparatus according to the first embodiment.

The pump 121 is a pump device that is installed at a position downstream (on an ink outflow side) from the pressurizing tank 101 and upstream (on an ink inflow side) from the accumulator 131 on the ink flow path 203, and pressure-feeds and conveys the ink IK1, which is accumulated in the pressurizing tank 101, toward the accumulator 131 in the direction indicated by arrow A in FIG. 5 on the ink flow path 203. The pump 121 is a diaphragm pump that has a film called a diaphragm, which is an elastic body for separating ink and a structure, and that pressure-feeds the ink through contraction of the diaphragm. The speed of rotation of the pump 121 is controlled by the pressure control device 117.

The filter 122 is a device that is installed at a position downstream from the pump 121 on the ink flow path 203 and that removes foreign matter in the ink which is pressure-fed by the pump 121.

The accumulator 131 is installed on the ink flow path 203 at a position downstream from the filter 122 and upstream from the discharge head 123, and is a pressure accumulator that absorbs and compensates for the increase and decrease in the pressure of the ink flowing inside to mitigate the fluctuation in the pressure. That is, the accumulator 131 is installed on the ink flow path 203 at a position downstream from the pressurizing tank 101 and upstream from the discharge head 123, and absorbs the fluctuation of the pressure of the ink flowing through the ink flow path 203. The accumulator 131 has a function to convert the pressure energy of liquid ink into the pressure energy of gas and to store the pressure energy. Specifically, the accumulator 131 absorbs the pressure energy applied to the liquid ink by reducing the volume of the gas, and meanwhile functions to compensate for the pressure energy of the liquid by using the pressure energy of the gas when the pressure energy of the ink is lost. Therefore, a damper effect of absorbing and compensating for the increase/decrease in the pressure can be exhibited, and the fluctuation in the pressure is mitigated. In this case, because the inside of the ink flow path 203 is sealed, the increase/decrease in the pressure of the ink becomes approximately the increase/decrease of the flow rate of the ink as is, and thus the accumulator 131 also serves to mitigate the flow rate of the ink.

For example, as illustrated in FIG. 2A, the accumulator 131 includes a main body 131*a* and a film 131*b*. The film 131*b* is called a bladder, and a gas such as nitrogen gas is sealed therein. In order to efficiently exert the effect of mitigating the pressure fluctuation of the ink by means of the accumulator 131, a gas such as a nitrogen gas is sealed inside the film 131*b* at a sealing pressure of about 60% of the pressure of the ink. In a case where the pressure of the ink flowing through the ink flow path 203 is small, as illustrated in FIG. 2A, the gas enclosed in the film 131*b* expands, and the film 131*b* enters a state of being in close contact with the inner wall surface of the main body 131*a*. Then, when the pressure of the ink flowing through the ink flow path 203 increases, as illustrated in FIG. 2B, the film 131*b* in which the gas is enclosed is reduced and the gas is compressed, and thus the pressure energy of the ink is absorbed by the gas. On the other hand, when the pressure of the ink flowing through the ink flow path 203 drops, as illustrated in FIG. 2C, the film 131*b* filled with the gas expands, and pressure energy is applied from the gas to the ink. Through these operations, the accumulator 131 functions to maintain a constant pressure of the ink flowing through the ink flow path 203, and, as a result, fluctuation in the pressure of the ink can be mitigated.

Note that, in the example illustrated in FIG. 1, the accumulator 131 is used as a device that mitigates the pressure fluctuation of the ink flowing through the ink flow path 203, but the invention is not limited thereto. Instead of the accumulator 131, a piston pressing mechanism 131-2 (an example of a first mitigation device) illustrated in FIGS. 3A and 3B, a subtank 131-3 illustrated in FIGS. 4A and 4B (an example of a first mitigation device), or the like may be used as a device that mitigates the pressure fluctuation.

As illustrated in FIGS. 3A and 3B, the piston pressing mechanism 131-2 includes a shock absorber 131-2*a*, a cylinder 131-2*b*, and a piston 131-2*c*, for example. As illustrated in FIGS. 3A and 3B, the shock absorber 131-2*a* is a member that attenuates and absorbs the fluctuation in the pressure from the ink flowing through the ink flow path 203 applied to the coupled piston 131-2*c*. The cylinder 131-2*b* is a cylindrical member that enables the piston 131-2*c*, to which the shock absorber 131-2*a* is coupled, to move slidably along an inner wall surface of the cylinder. The piston 131-2*c* is a member that is coupled to the shock absorber 131-2*a* and that reciprocates slidably along the inner wall surface of the cylinder 131-2*b*. The fluctuation in the pressure of the ink received from the bottom surface of the piston 131-2*c* is absorbed by the action of the shock absorber 131-2*a* coupled to the piston 131-2*c*. Due to this operation, the piston pressing mechanism 131-2 functions so that the pressure of the ink flowing through the ink flow path 203 is kept constant, and as a result, enables the fluctuation in the ink pressure to be mitigated.

As illustrated in FIGS. 4A and 4B, the subtank 131-3 is a tank member in which a high-pressure gas is sealed. When the pressure of the ink flowing through the ink flow path 203 increases, the enclosed gas is reduced and compressed, and the pressure energy of the ink is absorbed by the gas, as illustrated in FIG. 4A. On the other hand, when the pressure of the ink flowing through the ink flow path 203 drops, the enclosed gas expands, and pressure energy is applied from the gas to the ink, as illustrated in FIG. 4B. Through these operations, the subtank 131-3 functions so that the pressure of the ink flowing through the ink flow path 203 is kept constant, and as a result, the fluctuation in the pressure of the ink can be mitigated.

The pressure gauge 115 is a pressure gauge that measures the pressure of the ink flowing through the ink flow path 203. In the example of FIG. 1, the pressure gauge 115 is installed at a position downstream from the accumulator 131 and upstream from the discharge head 123 on the ink flow path 203, and that measures the pressure obtained by adding the discharge pressure when discharging the ink of the pump 121 to the pressure applied to the ink IK1 in the pressurizing tank 101 by the high-pressure air supply source 200 and subtracting the pressure loss in each device arranged on the upstream side from the pressure gauge 115 on the ink flow path 203. In order to achieve stable ink discharge from the nozzles of the discharge head 123, the pressure of the ink flowing through the discharge head 123 is stable. Therefore, in order to measure the pressure of the ink flowing to the discharge head 123 as accurately as possible, it is desirable to install the pressure gauge 115 at a position upstream from the discharge head 123 and as close to the discharge head 123 as possible to reduce the pressure loss of the ink without arranging anything other than the ink flow path 203 between the pressure gauge 115 and the discharge head 123. In this case, the pressure of the ink flowing through the discharge head 123 measured by the pressure gauge 115 is referred to as the discharge pressure. Data on the pressure of the ink measured by the pressure gauge 115 is transmitted to the pressure control device 117.

The discharge head 123 is an inkjet head that includes one or a plurality of openable-closable nozzles and that discharges high-viscosity ink from the nozzles. The open-close control of the nozzles of the discharge head 123 is performed by the nozzle open-close control device 125. Specifically, the discharge head 123 uses a system in which a needle is operated by an actuator to open and close a nozzle. This system is a system in which a needle with a lid (plug) on a nozzle is lifted by an actuator so that ink flows out to the outside through the nozzle. In this case, when the outflow of the ink is stopped by quickly pressing the needle against the nozzle so as to cover (plug) the nozzle, the ink that has flown out becomes a droplet and is vigorously discharged substantially in the direction of the center line of the nozzle, and lands on the print medium while maintaining the droplet state up to about 50 mm ahead. For example, the configuration disclosed in Japanese Unexamined Patent Application Publication No. 2004-142382 can be adopted as the configuration of the discharge head 123. Furthermore, the discharge head 123 includes an in-head flow path (internal flow path) communicating with one or a plurality of nozzles, and one end of the flow path serving as an input hole is coupled to an ink flow path 203, while the other end serving as a discharge hole is coupled to an ink flow path 204 (an example of a liquid flow path). That is, the ink that is conveyed from the ink flow path 203 flows through the above-described in-head flow path (internal flow path), and the ink is discharged from the in-head flow path through the nozzles. The ink flow path 204 is coupled to an upper portion of the pressurizing tank 101. That is, the ink flow path 204 which is a "liquid flow path" indicates a flow path through which the ink flowing out from the in-head flow path (internal flow path) of the discharge head 123 flows into the pressurizing tank 101. Thus, a circulation path is formed in which the ink repeatedly circulates in the liquid flow path formed of the ink flow path 203 and the ink flow path 204 in the order of the pressurizing tank 101, the accumulator 131, the discharge head 123, and the pressurizing tank 101. When the pump 121 is driven, the ink is conveyed in the circulation path in the direction of arrow A, and as a result, the ink also passes through the discharge head 123. In this manner, a state in which the ink circulates in the circulation path to cause the ink to flow into the discharge head 123 is referred to as flow-through. In addition, the state in which the pump 121 is driven to cause ink to continuously flow into the discharge head 123 (the state in which the pump 121 circulates ink in the circulation path) when the discharge head 123 is discharging ink or not discharging ink is referred to as a constant flow-through.

The nozzle open-close control device 125 is a device that performs open-close control of a nozzle by using an actuator to operate a needle of the discharge head 123.

The pressure control device 117 is a device that receives the data on the pressure of the ink measured by the pressure gauge 115 and that freely controls the speed of rotation of the pump 121 so that the pressure be a given pressure (a predetermined value). Furthermore, the pressure control device 117 performs stable pressure control of the ink by controlling the speed of rotation of the pump 121 in conjunction with the nozzle open-close control device 125 on the basis of the data on the pressure (discharge pressure) of the ink measured by the pressure gauge 115 when the nozzle of the discharge head 123 is not open. In this case, the pressure control device 117 detects the open state of the nozzle of the nozzle open-close control device 125 via the control device 300.

Further, the pressure control device 117 temporarily raises or lowers the discharge pressure by controlling the speed of rotation of the pump 121. For example, a solid material is dispersed in the ink, and sometimes aggregated ink, foreign matter, or the like, is filtered and accumulated by the filter 122. As a result, the fluid resistance in the filter 122 increases, and the pressure of the ink measured by the downstream pressure gauge 115, that is, the discharge pressure drops. In this case, the pressure control device 117 stabilizes the discharge pressure to a constant value by raising or lowering (in this case, raising) the discharge pressure by the pump 121 on the basis of the pressure of the ink measured by the pressure gauge 115. Furthermore, for example, in order to recover an abnormal state such as clogging of the nozzle of the discharge head 123 with ink, the pressure control device 117 also, as nozzle cleaning, temporarily increases the discharge amount of ink by the pump 121 (increases the discharge pressure) and increases the discharge pressure in accordance with an instruction from a host control device 300, thereby discharging the ink clogged in the nozzle.

The control device 300 is a controller that controls the operation of the entire ink supply apparatus 100. The control device 300 performs, for example, on/off control of the stirring operation of the stirring device 103, control of the nozzle open-close control device 125, and control of the pressure control device 117.

Note that the ink supply apparatus 100 may include other constituent elements in addition to the constituent elements illustrated in FIG. 1. For example, the ink supply apparatus 100 may include, for example, a flow path opening/sealing valve including an electromagnetic valve or the like that controls the start and stop of the ink flow, a safety valve for releasing the high pressure of the pressurizing tank 101 to the atmosphere, a discharge switching flow path for discharging the ink from the circulation path, and the like.

Stabilization of Ink Pressure and Flow Rate

FIG. 5 is a diagram illustrating a configuration for measuring a pressure and a flow rate of ink flowing into a discharge head in the ink supply apparatus according to the first embodiment. FIGS. 6A to 6F are diagrams illustrating examples of graphs illustrating comparison results of the pressure and the flow rate of the ink flowing into the discharge head according to the presence or absence of the accumulator in the ink supply apparatus according to the first embodiment. With reference to FIGS. 5 to 6F, stabilization of the pressure (discharge pressure) and flow rate of the ink flowing to the discharge head 123 by the accumulator 131 of the ink supply apparatus 100 according to the present embodiment will be described.

As described above, because the pump 121 includes a diaphragm (film), the ink in the pump 121 and the internal structure do not come into contact with each other, and thus defects such as contamination hardly occur. However, periodic fluctuations (pulsation) in the pressure and the flow rate of the ink due to contraction of the diaphragm (film) occur, which becomes an obstacle for maintaining a stable discharge pressure. As described above, because the ink supply apparatus 100 according to the present embodiment includes the accumulator 131 installed at a position downstream from the filter 122 and upstream from the discharge head 123 on the ink flow path 203, it is possible to suppress pulsations of the pressure and the flow rate of the ink due to the driving of the pump 121.

Furthermore, when the ink is discharged from the discharge head 123, the pressure of the ink flowing in the discharge head 123 is released to the atmosphere only for the opening period of the nozzle, and hence the discharge pressure drops. At the same time, when the ink is discharged from the nozzles of the discharge head 123, variation in the flow rate of the ink flowing to the discharge head 123 occurs in an amount equivalent to the total amount of the increase in the flow rate corresponding to the discharge amount of the ink on the upstream side from the discharge head 123 and the decrease in the flow rate corresponding to the discharge amount on the downstream side from the discharge head 123. That is, when the ink is discharged from the discharge head 123, a steep fluctuation occurs in the pressure (discharge pressure) and the flow rate of the ink. When ink is intermittently and continuously discharged from a plurality of nozzles of the discharge head 123, it is conceivable that the discharge pressure at a certain timing is not constant, depending on the state of discharge from the nozzles in the vicinity including the discharge head up to immediately before (crosstalk). As described above, because the ink supply apparatus 100 according to the present embodiment includes the accumulator 131 installed on the ink flow path 203 at a position downstream from the filter 122 and upstream from the discharge head 123, it is possible to suppress the fluctuation in the pressure and the flow rate due to the discharge of the ink from the discharge head 123.

Here, a specific example illustrating the advantageous effect, in the ink supply apparatus 100 according to the present embodiment, of the pressure (discharge pressure) and the flow rate of the ink flowing through the discharge head 123 being stabilized by the accumulator 131 will be described with reference to FIGS. 5 to 6F. In the ink supply apparatus 100 illustrated in FIG. 5, in order to measure the flow rate of the ink flowing into the discharge head 123, a flow meter 140 is installed at a position downstream from the accumulator 131 and upstream from the pressure gauge 115 on the ink flow path 203 with respect to the ink supply apparatus 100 illustrated in FIG. 1. In the ink supply apparatus 100 illustrated in FIG. 5, the pump 121 circulates the ink in the circulation path. In such a case, FIGS. 6A to 6F illustrate graphs relating to the pressure (pressure measured by the pressure gauge 115) and the flow rate (flow rate measured by the flow meter 140) of the ink flowing through the discharge head 123 in a case where the accumulator 131 is not installed and in a case where installation thereof is desired in the configuration of the ink supply apparatus 100 illustrated in FIG. 5.

Figure 6A:
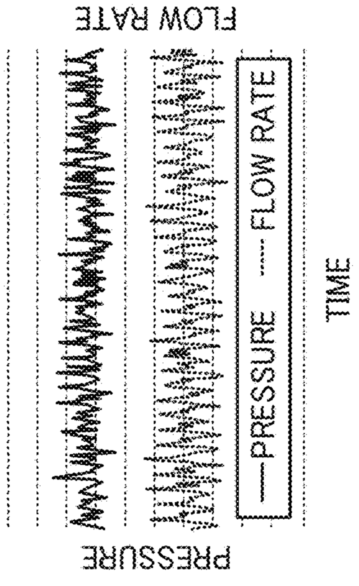
FIGS. 6A to 6F are diagrams illustrating examples of graphs illustrating comparison results of the pressure and the flow rate of the ink flowing into the discharge head according to the presence or absence of the accumulator in the ink supply apparatus according to the first embodiment.

The graph illustrated in FIG. 6A illustrates, in chronological order, the pressure value and the flow rate value of the ink flowing through the discharge head 123 in a case where the accumulator 131 is not installed. On the other hand, the graph illustrated in FIG. 6D illustrates, in chronological order, the pressure value and the flow rate value of the ink flowing through the discharge head 123 in a case where the accumulator 131 is installed. Note that both graphs are raw data measured by the pressure gauge 115 and the flow meter 140, and thus include fine noise. As becomes clear upon comparing both graphs, it is understood that the periodic ink pressure and flow rate fluctuations (amplitudes) appearing in the graph of FIG. 6A are significantly suppressed as illustrated in the graph of FIG. 6D.

Figure 6B:
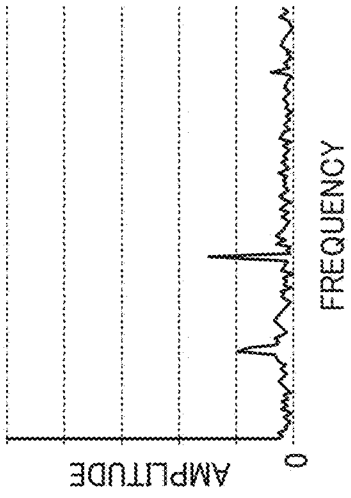

The graph illustrated in FIG. 6B illustrates results obtained by analyzing, using an FFT (fast Fourier Transform), the pressure value of the ink flowing through the discharge head 123 in a case where the accumulator 131 is not installed. On the other hand, the graph illustrated in FIG. 6E illustrates a result of FFT analysis of the pressure value of the ink flowing through the discharge head 123 in a case where the accumulator 131 is installed. As becomes clear upon comparing both graphs, in a case where the accumulator 131 is not installed, peaks occur at two specific frequencies, and it is understood that a strong fluctuation in the pressure value occurs at these frequencies. It is known that the frequencies of these peaks are caused by the speed of rotation of the pump 121 because the frequency also increases when the discharge amount of the pump 121 is increased, that is, the speed of rotation of the pump 121 is increased. On the other hand, the peaks are not observed in the graph in a case where the accumulator 131 is installed, and it is understood that the fluctuation in the pressure value at said frequencies is suppressed.

Figure 6C:
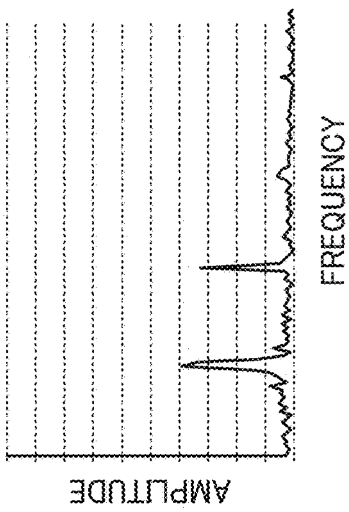
Figure 6D:
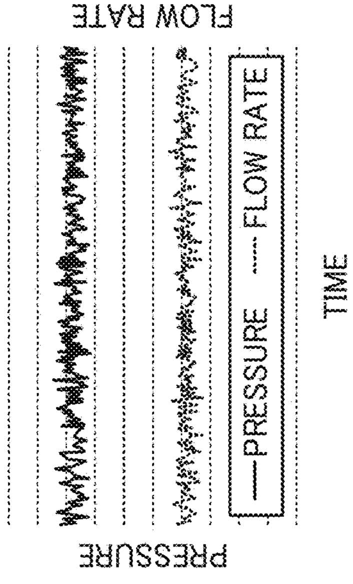
Figure 6E:
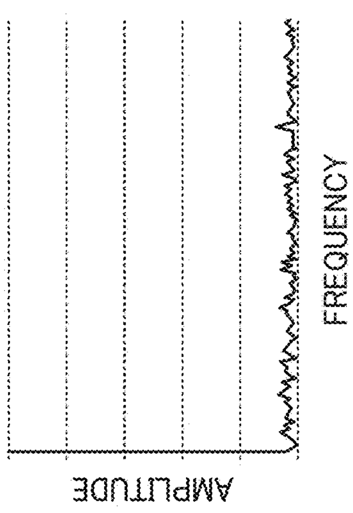
Figure 6F:
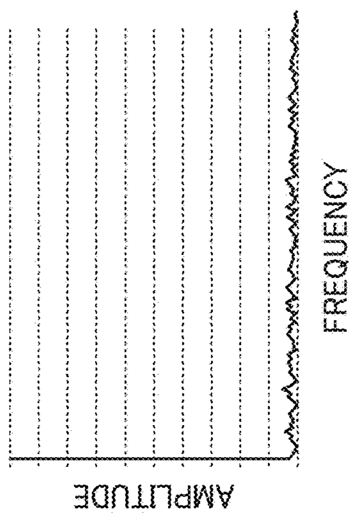

The graph illustrated in FIG. 6C illustrates a result of FFT analysis of the flow rate value of the ink flowing through the discharge head 123 in a case where the accumulator 131 is not installed. On the other hand, the graph illustrated in FIG. 6F illustrates a result of FFT analysis of the flow rate value of the ink flowing through the discharge head 123 in a case where the accumulator 131 is installed. As becomes clear upon comparing both graphs, in a case where the accumulator 131 is not installed, peaks occur at two specific frequencies, and it is understood that a strong fluctuation in the flow rate value occurs at these frequencies. As described above, it is known that the frequencies of these peaks are caused by the speed of rotation of the pump 121 because the frequency also increases when the discharge amount of the pump 121 is increased, that is, the speed of rotation of the pump 121 is increased. On the other hand, the peaks are not recognized in the graph in a case where the accumulator 131 is installed, and it is understood that the fluctuation of the flow rate value at these frequencies is suppressed.

In light of the foregoing, as illustrated in FIGS. 6A to 6F, it is understood that, by installing the accumulator 131 at a position downstream from the filter 122 (the downstream side from the pump 121) and upstream from the discharge head 123 on the ink flow path 203, the pulsation of the pressure and the flow rate of the ink due to the driving of the pump 121 is suppressed, and the pulsation is suppressed to such an extent that peaks are not detected even using FFT analysis.

As described above, in the ink supply apparatus 100 according to the present embodiment, the pressurizing tank 101 is supplied with the air compressed by the high-pressure air supply source 200 and accumulates the ink pressurized by the compressed air, the pump 121 is installed on the ink flow path 203 at a position downstream from the pressurizing tank 101 and upstream from the accumulator 131 and pressure-feeds the ink in the pressurizing tank 101 toward the accumulator 131 to the ink flow path 203, the discharge head 123 includes an internal flow path through which the ink conveyed from the ink flow path 203 flows and discharges the ink from the internal flow path via the nozzles, the accumulator 131 is installed in the ink flow path 203 on the downstream side from the pressurizing tank 101 and on the upstream side from the discharge head 123 and absorbs the fluctuation in the pressure of the ink flowing through the ink flow path 203, a circulation path is formed in which the ink circulates in the ink flow path in the order of the pressurizing tank 101, the accumulator 131, the discharge head 123, and the pressurizing tank 101, and the pump 121 circulates the ink in the circulation path. As a result, fluctuations in the pressure and the flow rate due to the discharge of the ink from the discharge head 123 can be suppressed, and hence the high-viscosity ink (an example of liquid) can be discharged stably and over a distance. Furthermore, the pulsation of the pressure and the flow rate of the ink due to the driving of the pump 121 can be suppressed.

Second Embodiment

An ink supply apparatus according to a second embodiment will be described by focusing on differences from the ink supply apparatus 100 according to the first embodiment. In the present embodiment, a configuration in which an accumulator is also installed at a position downstream from the discharge head 123 will be described.

Figure 7:
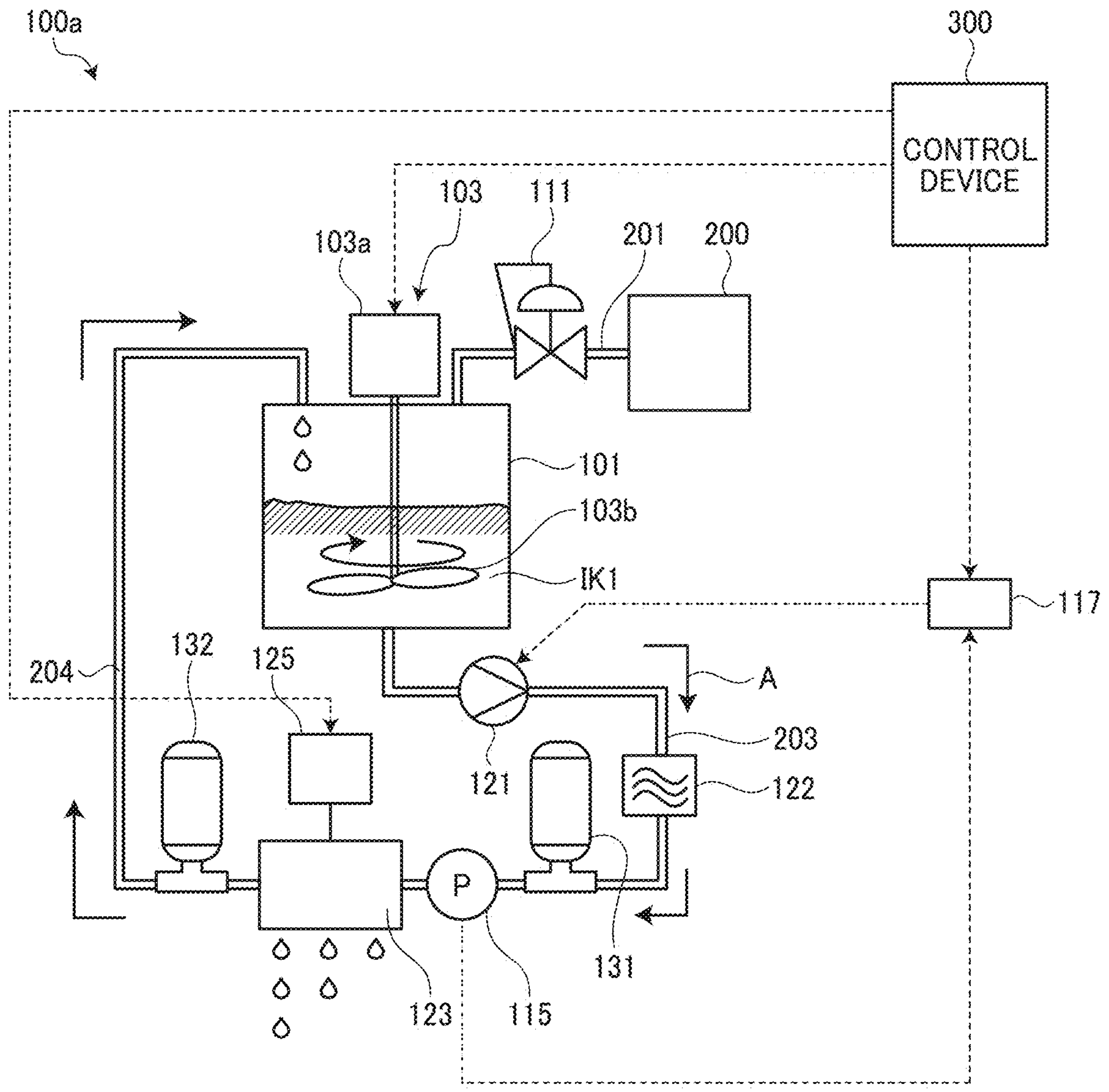
FIG. 7 is a diagram illustrating a configuration of an ink supply apparatus according to a second embodiment of the present disclosure.

FIG. 7 is a diagram illustrating a configuration of an ink supply apparatus according to the second embodiment. The configuration of the ink supply apparatus 100*a* according to the present embodiment will be described with reference to FIG. 7.

As illustrated in FIG. 7, the ink supply apparatus 100*a* includes a high-pressure air supply source 200 (compressed air supply source), a regulator 111, a pressurizing tank 101, a stirring device 103, a pump 121 (an example of a feeder), a filter 122, an accumulator 131 (an example of a first mitigation device), a pressure gauge 115, a discharge head 123, a nozzle open-close control device 125, an accumulator 132 (an example of a second mitigation device), a pressure control device 117 (a first control device), and a control device 300. That is, the configuration of the ink supply apparatus 100*a* is similar to the configuration of the ink supply apparatus 100 according to the above-described first embodiment except that the accumulator 132 is provided.

The accumulator 132 is installed at a position immediately downstream from the discharge head 123 on the ink flow path 204, and is a pressure accumulator that absorbs and compensates for the increase/decrease in the pressure of the ink flowing inside to mitigate the fluctuation in the pressure. That is, the accumulator 132 is installed on the ink flow path 204 at a position downstream from the discharge head 123 and upstream from the pressurizing tank 101, and absorbs the fluctuation of the pressure of the ink flowing through the ink flow path 204. The configuration of the accumulator 132 is similar to the configuration of the accumulator 131, and instead of the accumulator 132, the piston pressing mechanism 131-2 (an example of the second mitigation device) illustrated in FIGS. 3A and 3B described above or the subtank 131-3 (an example of the second mitigation device) illustrated in FIGS. 4A and 4B may be used.

Between a nozzle located most upstream on the circulation flow path in the discharge head 123, that is, the nozzle closest to the accumulator 131, and a nozzle located most downstream on the circulation path, that is, the nozzle farthest from the accumulator 131, the magnitude of the pressure loss varies depending on the shape, distance, and the like of the flow path in the discharge head 123 to the accumulator 131, and hence the pressure of the ink may vary.

The discharge head 123 is freely movable in a printable region of the image forming apparatus on which the ink supply apparatus 100*a* is mounted, and a plurality of nozzles is arranged so as to be as narrow as possible between the nozzles in order to discharge ink at any place in the printable region. In order to uniformly impart a damper effect to all the nozzles, it is conceivable to dispose a damper member for each nozzle, but this is unrealistic in view of the size and configuration layout of the discharge head 123. Therefore, in the present embodiment, as described above, the accumulator 132 is installed at a position immediately downstream from the discharge head 123 on the ink flow path 204. As a result, the damper effect can be more uniformly exhibited for all the nozzles of the discharge head 123, and fluctuations in the pressure and the flow rate due to the discharge of the ink from the discharge head 123 can be more effectively suppressed.

Note that the accumulator 132 is desirably installed at a position downstream from the discharge head 123 and as close possible to the discharge head 123 in order to reduce the pressure loss in the flow path.

Third Embodiment

An ink supply apparatus according to a third embodiment will be described by focusing on differences from the ink supply apparatus 100 according to the first embodiment. In the present embodiment, a configuration in which another pressurizing tank is provided in addition to the pressurizing tank 101 will be described.

Configuration of Ink Supply Apparatus

Figure 8:
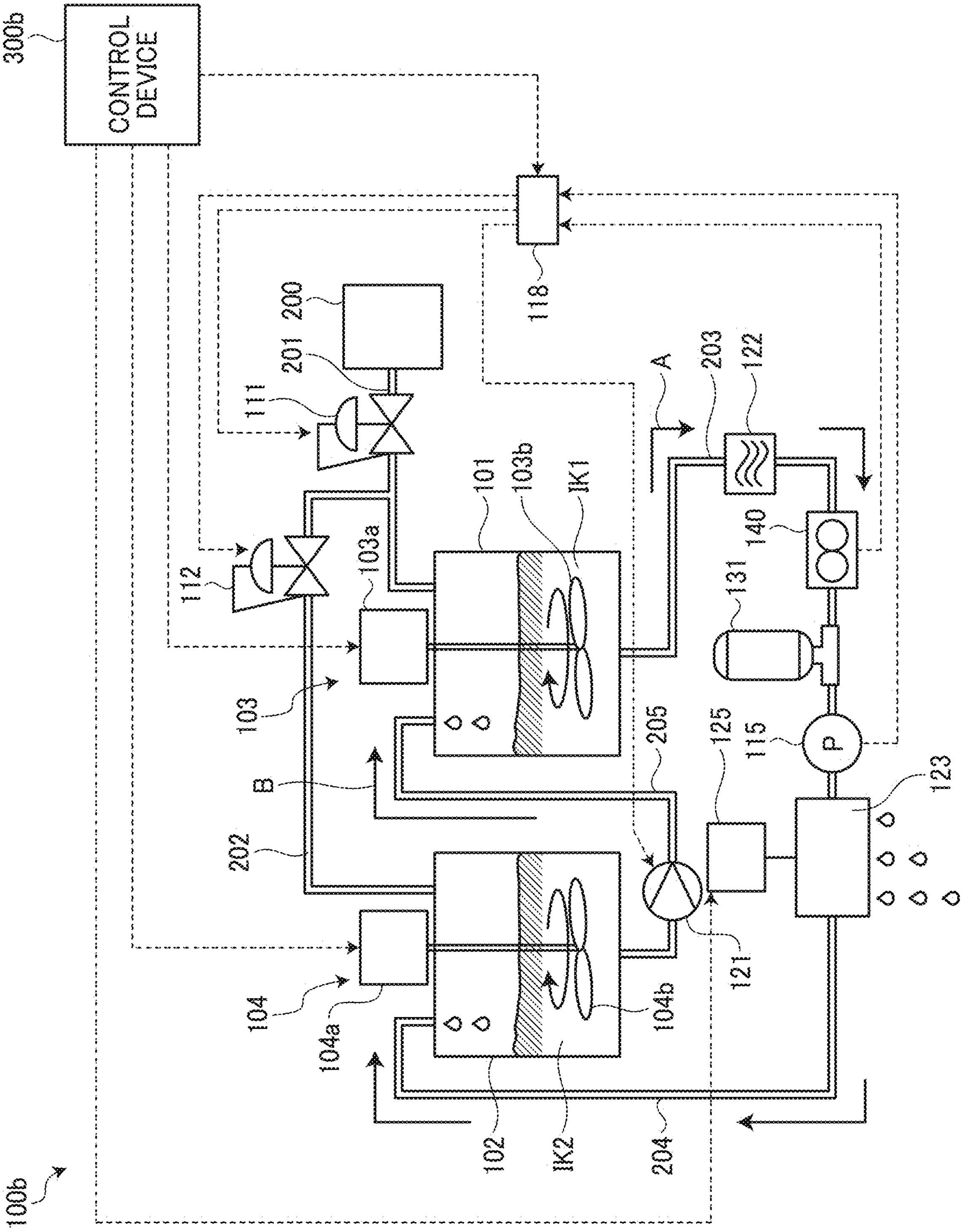
FIG. 8 is a diagram illustrating a configuration of an ink supply apparatus according to a third embodiment of the present disclosure.

FIG. 8 is a diagram illustrating a configuration of an ink supply apparatus according to a third embodiment of the present disclosure. A configuration of an ink supply apparatus 100*b* according to the present embodiment will be described with reference to FIG. 8.

As illustrated in FIG. 8, the ink supply apparatus 100*b* includes a high-pressure air supply source 200 (compressed air supply source), a regulator 111 (first regulator), a pressurizing tank 101 (first pressurizing tank), a stirring device 103, a regulator 112 (second regulator), a pressurizing tank 102 (second pressurizing tank), a stirring device 104, a pump 121, a filter 122, a flow meter 140, an accumulator 131 (an example of a first mitigation device), a pressure gauge 115, a discharge head 123, a nozzle open-close control device 125, a pressure flow rate control device 118 (second control device), and a control device 300*b*.

The regulator 111 is a regulator device that is installed on the air supply path 201 and that reduces the pressure of the high-pressure air supplied from the high-pressure air supply source 200 to a given pressure (first pressure). That is, the regulator 111 adjusts the pressure of the air supplied from the air supply path 201 to a given pressure greater than atmospheric pressure and lower than the pressure of the air compressed by the high-pressure air supply source 200, and uses the air at that pressure to pressurize an ink IK1, which is the high-viscosity ink accumulated in the pressurizing tank 101. Adjustment of the pressure reduction by the regulator 111 is controlled by a pressure flow rate control device 118 to be described below.

The regulator 112 is a regulator device that is installed on an air supply path 202 branched from the air supply path 201, and reduces the pressure of the high-pressure air supplied from the high-pressure air supply source 200 and passing through the regulator 111 to a predetermined pressure (second pressure) that is lower than the first pressure. That is, the regulator 112 adjusts the pressure of the air supplied from the air supply path 201 and passing through the regulator 111 to a given pressure greater than the atmospheric pressure and lower than the pressure of the air decompressed by the regulator 111, and pressurizes the ink IK2, which is the high-viscosity ink with which the pressurizing tank 102 is filled, by means of air at this pressure. Adjustment of the pressure reduction by the regulator 112 is controlled by a pressure flow rate control device 118 to be described below. The air supply path 202 on which the regulator 112 is installed is coupled to an upper portion of a pressurizing tank 102 described below.

The pressurizing tank 102 is a tank filled with the ink IK2, which is a high-viscosity ink. The air supply path 202 is coupled to an upper portion of the pressurizing tank 102. The compressed air that is sent from the high-pressure air supply source 200 and passes through the regulator 111 and the regulator 112 is supplied into the pressurizing tank 102 to pressurize the ink IK2 in the pressurizing tank 102. Furthermore, an ink flow path 205 (an example of a liquid flow path) that enables the ink IK2 to flow out is coupled to a lower portion of the pressurizing tank 102, and the ink flow path 205 is coupled to an upper portion of the pressurizing tank 101. That is, the ink flow path 205 which is a "liquid flow path" indicates a flow path through which the ink flowing out from the pressurizing tank 102 flows into the pressurizing tank 101. The ink flow path 204 coupled to the discharge hole of the in-head flow path of the discharge head 123 is coupled to the upper portion of the pressurizing tank 102. Thus, the ink flowing out from the in-head flow path of the discharge head 123 is conveyed to the pressurizing tank 102 through the ink flow path 204. The ink accumulated in the pressurizing tank 102 is supplied (conveyed) to the pressurizing tank 101 by the pump 121, and the ink accumulated in the pressurizing tank 101 is conveyed toward the accumulator 131 by the pump 121.

The "feeder" according to the present embodiment corresponds to the pressurizing tank 101, the pressurizing tank 102, the regulator 111, the regulator 112, and the pump 121. Thus, a circulation path is formed in which ink repeatedly circulates in the liquid flow path formed of the ink flow path 203, the ink flow path 204, and the ink flow path 205 in the order of the pressurizing tank 101, the accumulator 131, the discharge head 123, the pressurizing tank 102, and the pressurizing tank 101. Furthermore, a pressure difference is generated between the pressurizing tank 101 and the pressurizing tank 102 by the pressure reduction processing of the regulator 111 and the regulator 112, and the ink is conveyed in the direction indicated by arrow A from the bottom of the pressurizing tank 101 by the pressure difference, the ink circulates in the circulation path, and the ink also passes through the discharge head 123. As described above, also in the ink supply apparatus 100*b* according to the present embodiment, a flow-through state in which the ink flows through the discharge head 123 is implemented. In addition, the state in which ink continuously flows into the discharge head 123 (the state in which the pressurizing tank 101, the pressurizing tank 102, the regulator 1/1, and the regulator 112 circulate ink in the circulation path) due to the above-described pressure difference when the discharge head 123 is discharging ink or not discharging ink is referred to as a constant flow-through.

Note that the pressurizing tank 102 may include, for example, a water level gauge for measuring the fill amount of the ink IK2, an ink temperature controller such as a heater or a cooler for managing the viscosity of the ink IK2, a thermometer for managing and controlling the temperature of the ink IK2, and the like.

The stirring device 104 is a device for stirring the ink IK2 with which the pressurizing tank 102 is filled. The stirring device 104 includes a stirring motor 104*a* and a stirrer 104*b*.

The stirring motor 104*a* is a motor device for stirring the ink IK2 by rotationally driving the stirrer 104*b*. The on/off operation of the rotation of the stirring motor 104*a* is controlled by the control device 300*b*.

The stirrer 104*b* is a stirring member that rotates under the rotation of the stirring motor 104*a* to stir the ink IK2.

The pump 121 is a pump device that is installed on the ink flow path 205 and that pressure-feeds the ink IK2 in the pressurizing tank 102 in the direction of arrow B of the ink flow path 205. The pressurizing tank 102 has the ink in the pressurizing tank 101 continuously flowing therein via the circulation path. On the other hand, because the ink in the pressurizing tank 101 continues to flow out to the ink flow path 203 due to the air pressurized by the regulator 111, the ink is eventually depleted. Therefore, due to the driving of the pump 121, the ink in the pressurizing tank 102 is continuously or intermittently returned to the pressurizing tank 101 via the ink flow path 205. The pump 121 contains a film called a diaphragm, which is an elastic body that separates the ink and the structure, and pressure-feeds the ink through contraction of the diaphragm. The speed of rotation of the pump 121 is controlled by the pressure flow rate control device 118.

The flow meter 140 is a flowmeter which is installed on the downstream side from the filter 122 on the ink flow path 203, and which measures the flow rate of the ink flowing through the ink flow path 203. The accumulator 131 is installed on the downstream side from the flow meter 140 on the ink flow path 203.

The pressure gauge 115 is a pressure gauge that measures the pressure of the ink flowing through the ink flow path 203. In the example of FIG. 8, the pressure gauge 115 is installed at a position downstream from the accumulator 131 and upstream from the discharge head 123 on the ink flow path 203, and measures the pressure obtained by subtracting the pressure loss in each device arranged on the upstream side from the pressure gauge 115 on the ink flow path 203 from the pressure applied to the ink IK1 in the pressurizing tank 101 by the high-pressure air supply source 200. Data on the pressure of the ink measured by the pressure gauge 115 is transmitted to the pressure flow rate control device 118.

The pressure flow rate control device 118 is a device that receives data on the pressure of the ink measured by the pressure gauge 115 and that controls the pressure reduction operation by the regulator 111 and the regulator 112 so that the pressure becomes a given pressure (a predetermined value). Furthermore, the pressure flow rate control device 118 performs stable pressure control of the ink by controlling the pressure reduction operation by the regulator 111 and the regulator 112 on the basis of the data on the pressure (discharge pressure) of the ink measured by the pressure gauge 115 when the nozzle of the discharge head 123 is not open, in conjunction with the nozzle open-close control device 125. In this case, the pressure flow rate control device 118 detects the open state of the nozzle of the nozzle open-close control device 125 via the control device 300*b*. Furthermore, the pressure flow rate control device 118 receives the data on the flow rate of the ink measured by the flow meter 140, and controls the drive time and the speed of rotation of the pump 121 so that the ink IK1 in the pressurizing tank 101 is not depleted.

In addition, the pressure flow rate control device 118 controls the pressure difference between the pressurizing tank 101 and the pressurizing tank 102 by controlling the pressure reduction processing for the regulator 111 and the regulator 112, thereby temporarily increasing or decreasing the discharge pressure. For example, a solid material is dispersed in the ink, and sometimes aggregated ink, foreign matter, or the like, is filtered and accumulated by the filter 122. As a result, the fluid resistance in the filter 122 increases, and the pressure of the ink measured by the downstream pressure gauge 115, that is, the discharge pressure, drops. In this case, the pressure flow rate control device 118 stabilizes the discharge pressure at a constant value by raising or lowering (in this case, raising) the pressure set value for the regulator 111 on the basis of the pressure of the ink measured by the pressure gauge 115. Furthermore, because the flow rate of the ink increases when the pressure difference between the pressurizing tank 101 and the pressurizing tank 102 increases, the pressure flow rate control device 118 controls the pressure difference between the pressurizing tank 101 and the pressurizing tank 102 by increasing the discharge amount of the pump 121, extending the operating time, or changing the pressure set value of the regulator 112.

The control device 300*b* is a controller that controls the operation of the entire ink supply apparatus 100*b*. The control device 300*b* performs, for example, on/off control of the stirring operations of the stirring device 103 and the stirring device 104, control of the nozzle open-close control device 125, and control of the pressure flow rate control device 118.

Note that the ink supply apparatus 100*b* may include other constituent elements in addition to the constituent elements illustrated in FIG. 8. For example, the ink supply apparatus 100*b* may include, for example, a flow path opening/sealing valve including an electromagnetic valve or the like that controls the start and stop of the ink flow, a safety valve for releasing the high pressure of the pressurizing tank 101 and the pressurizing tank 102 to the atmosphere, a discharge switching flow path for discharging the ink from the circulation path, and the like.

Stabilization of Ink Pressure and Flow Rate

Figure 9:
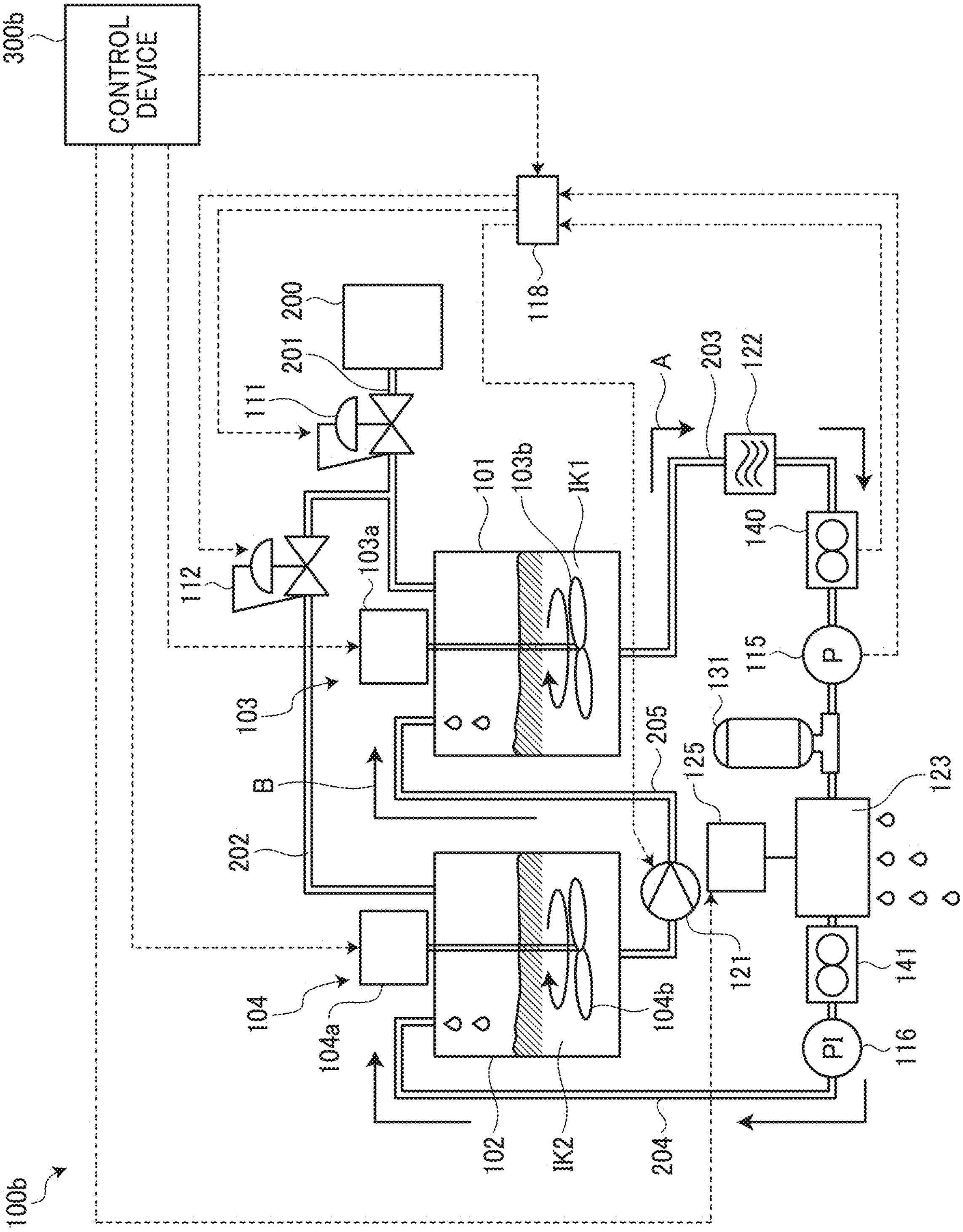
FIG. 9 is a diagram illustrating a configuration for measuring a pressure and a flow rate of ink upstream and downstream of a discharge head in an ink supply apparatus according to the third embodiment.

FIG. 9 is a diagram illustrating a configuration for measuring the pressure and the flow rate of the ink upstream and downstream from the discharge head in the ink supply apparatus according to the third embodiment. FIGS. 10A to 10D are diagrams illustrating examples of graphs illustrating a comparison result of the pressure and the flow rate of the ink upstream and downstream of the discharge head according to the presence or absence of the accumulator and the presence or absence of the constant flow-through in the ink supply apparatus according to the third embodiment. FIGS. 11A to 11D are diagrams illustrating examples of graphs illustrating a comparison result of the pressure and the flow rate of the ink upstream and downstream of the discharge head according to the presence or absence of the accumulator and the presence or absence of the constant flow-through in the ink supply apparatus according to the third embodiment. FIGS. 12A to 12D are diagrams illustrating examples of graphs illustrating a comparison result of the discharge amount of ink of the discharge head according to the presence or absence of the accumulator and the presence or absence of the constant flow-through in the ink supply apparatus according to the third embodiment. With reference to FIGS. 9 to 12D, stabilization of the pressure (discharge pressure) and flow rate of the ink flowing to the discharge head 123 by the accumulator 131 of the ink supply apparatus 100*b* according to the present embodiment will be described.

In the present embodiment, as described above, the pump 121 is used to prevent the ink IK1 in the pressurizing tank 101 from being depleted by returning the ink in the pressurizing tank 102 to the pressurizing tank 101 via the ink flow path 205. Due to the pressure difference between the pressurizing tank 101 and the pressurizing tank 102, the ink IK1 is conveyed in the direction of arrow A from the bottom of the pressurizing tank 101, and is circulated in the circulation path. Therefore, the pressure (discharge pressure) of the ink flowing through the discharge head 123 is not affected by the pulsation by the pump 121.

On the other hand, as per the first embodiment described above, when the ink is discharged from the discharge head 123, the pressure of the ink flowing in the discharge head 123 is released to the atmosphere only for the opening period of the nozzle, and hence the discharge pressure drops. At the same time, when the ink is discharged from the nozzles of the discharge head 123, variation in the flow rate of the ink flowing to the discharge head 123 occurs in an amount equivalent to the total amount of the increase in the flow rate corresponding to the discharge amount of the ink on the upstream side from the discharge head 123 and the decrease in the flow rate corresponding to the discharge amount on the downstream side from the discharge head 123. That is, when the ink is discharged from the discharge head 123, a steep fluctuation occurs in the pressure (discharge pressure) and the flow rate of the ink. Because the ink supply apparatus 100*b* according to the present embodiment includes the accumulator 131 installed on the downstream side from the filter 122 on the ink flow path 203 and on the upstream side from the discharge head 123, the fluctuation in the pressure and the flow rate due to the discharge of the ink from the discharge head 123 is suppressed.

Here, a specific example illustrating the advantageous effect, in the ink supply apparatus 100*b* according to the present embodiment, of the pressure (discharge pressure) and the flow rate of the ink being stabilized by the accumulator 131 in a case where the ink is discharged from the discharge head 123 will be described with reference to FIGS. 9 to 12D. In the case of the ink supply apparatus 100*b* illustrated in FIG. 9, in order to measure the pressure and the flow rate of the ink on the downstream side from the discharge head 123, unlike the ink supply apparatus 100*b* illustrated in FIG. 8, the flow meter 141 and the pressure gauge 116 are arranged at a position downstream from the discharge head 123 on the ink flow path 203. Furthermore, in the case of ink supply apparatus 100*b* illustrated in FIG. 9, in order to measure the pressure after the action of the damper effect by the accumulator 131 with respect to the pressure of the ink on the upstream side from the discharge head 123 in a case where the ink is discharged from the discharge head 123, the arrangement of the pressure gauge 115 and the accumulator 131 is switched around in comparison with the ink supply apparatus 100*b* illustrated in FIG. 8. In the ink supply apparatus 100*b* illustrated in FIG. 9, the ink is circulated in the circulation path by the pressure difference between the pressurizing tank 101 and the pressurizing tank 102.

First, FIGS. 10A to 10D illustrate graphs of the pressure and the flow rate of the ink on the upstream side from the discharge head 123 and the pressure and the flow rate of the ink on the downstream side in cases where the accumulator 131 is installed and not installed, and in a case where the ink is discharged from the discharge head 123 under the conditions of the constant flow-through state and the non-constant flow-through state, respectively. Here, the state in which constant flow-through is not performed refers to a state where the ink is not circulated in the circulation path during the discharge period of the discharge head 123 and where the ink is circulated in the circulation path outside the discharge period (hereinafter, referred to as intermittent flow-through).

Figure 10A:
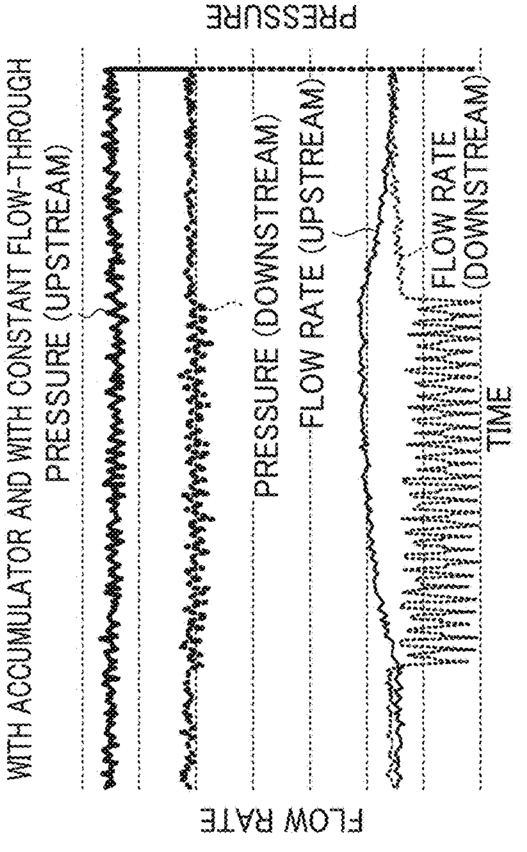
FIGS. 10A to 10D are diagrams illustrating examples of graphs illustrating comparison results of the pressure and the flow rate of the ink on the upstream side and the downstream side from the discharge head according to the presence or absence of the accumulator and the presence or absence of constant flow-through in the ink supply apparatus according to the third embodiment.
Figure 10B:
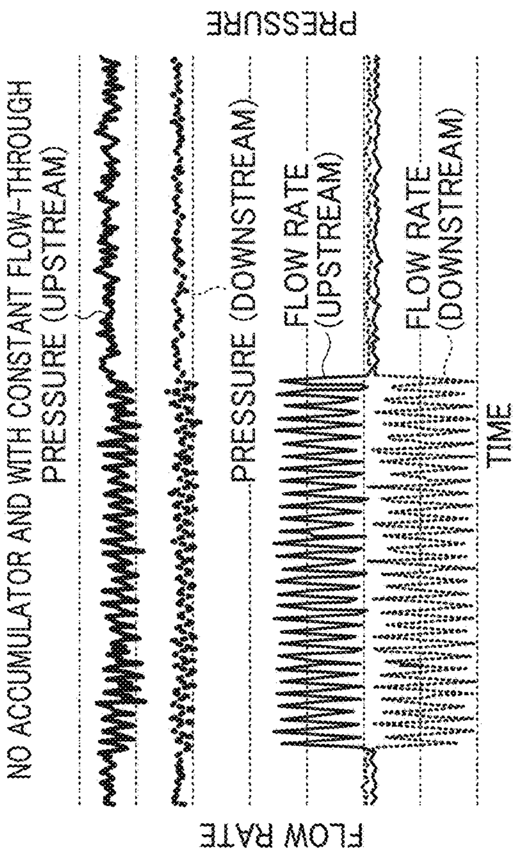

The graph illustrated in FIG. 10A illustrates, in chronological order, a pressure value (pressure value measured by the pressure gauge 115) and a flow rate value (flow rate value measured by the flow meter 140) of the ink on the upstream side from the discharge head 123, and a pressure value (pressure value measured by the pressure gauge 116) and a flow rate value (flow rate value measured by the flow meter 141) of the ink on the downstream side in a case where the ink is discharged from the discharge head 123 under the condition that the accumulator 131 is installed and in the constant flow-through state. On the other hand, the graph illustrated in FIG. 10B illustrates, in chronological order, the pressure value (pressure value measured by the pressure gauge 115) and the flow rate value (flow rate value measured by the flow meter 140) of the ink on the upstream side from the discharge head 123, and the pressure value (pressure value measured by the pressure gauge 116) and the flow rate value (flow rate value measured by the flow meter 141) of the ink on the downstream side in a case where the ink is discharged from the discharge head 123 under the condition that the accumulator 131 is not installed and in the constant flow-through state. Note that both graphs are raw data measured by the pressure gauges 115, 116 and the flow meters 140, 141, and thus include fine noise. As becomes clear upon comparing both pressure values graphs, it is understood that the fluctuation in the pressure value of the ink on the upstream side and the downstream side from the discharge head 123 illustrated in FIG. 10A is smaller than the fluctuation illustrated in FIG. 10B, and the fluctuation in the pressure due to the discharge of the ink of the discharge head 123 is suppressed by the accumulator 131. Further, as becomes clear upon comparing both flow rate value graphs, the fluctuation of the flow rate value of the ink on the downstream side from the discharge head 123 illustrated in FIG. 10A is smaller than the fluctuation illustrated in FIG. 10B, and it is understood that the fluctuation in the flow rate on the downstream side due to the discharge of the ink from the discharge head 123 is suppressed by the accumulator 131. Meanwhile, as for the flow rate value of the ink on the upstream side from the discharge head 123, as illustrated in FIG. 10A, fine amplitude is not observed, and it is understood that the flow rate value gradually increases, and after the timing at which the discharge ends, gradually decreases without immediately returning to the flow rate value at the time of non-discharge. As described above, it is confirmed to what extent the discharge amount of the ink by the discharge head 123 is affected by the fact that the flow rate value of the ink on the upstream side from the discharge head 123 gradually increases, and after the timing at which the discharge ends, gradually decreases without immediately returning to the flow rate value at the time of non-discharge. This will be described in detail in FIGS. 11A to 12D.

Figure 10C:
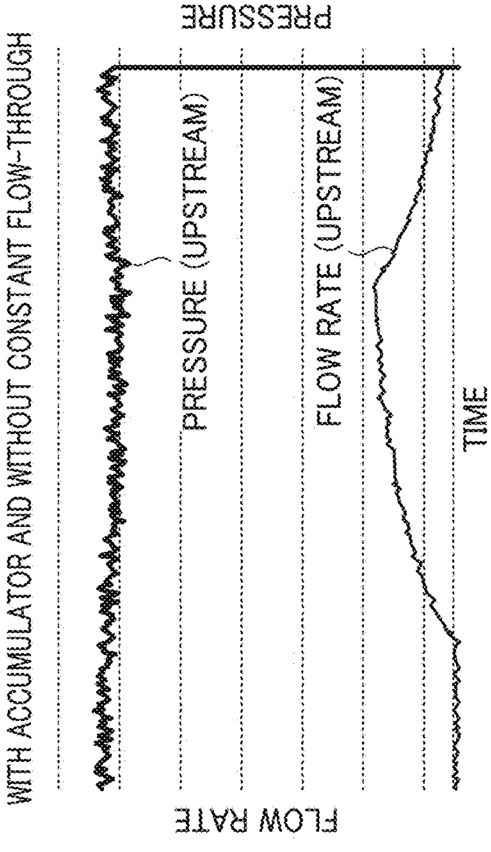
Figure 10D:
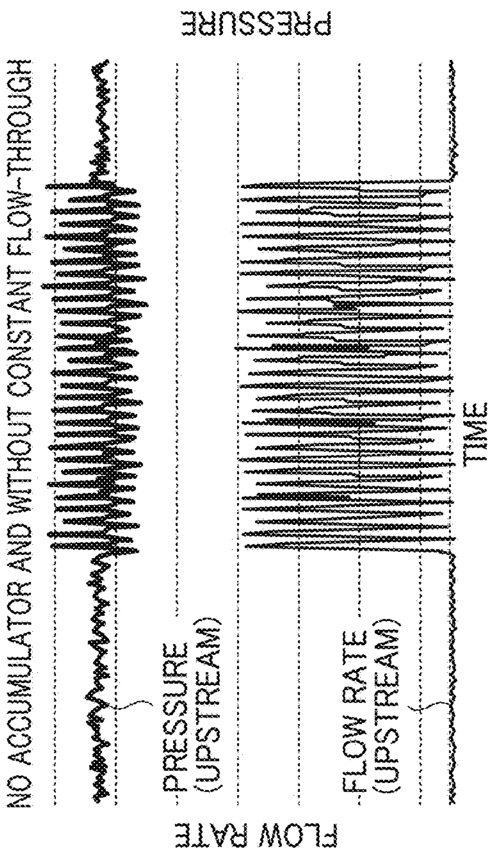

The graph illustrated in FIG. 10C illustrates, in chronological order, the pressure value (pressure value measured by the pressure gauge 115) and the flow rate value (flow rate value measured by the flow meter 140) of the ink on the upstream side from the discharge head 123 in a case where the accumulator 131 is installed and the ink is discharged from the discharge head 123 under the condition of not being in the constant flow-through state (that is, in the intermittent flow state). In this case, because the ink does not flow to the downstream side from the discharge head 123 due to a valve installed on the ink flow path 204 on the downstream side from the discharge head 123, the graph of the pressure value and the flow rate value on the downstream side from the discharge head 123 is not illustrated. On the other hand, the graph illustrated in FIG. 10D illustrates, in chronological order, the pressure value (pressure value measured by the pressure gauge 115) and the flow rate value (flow rate value measured by the flow meter 140) of the ink on the upstream side from the discharge head 123 in a case where the ink is discharged from the discharge head 123 under the condition where the accumulator 131 is not installed and the ink is not in the constant flow-through state (that is, in the intermittent flow state). As becomes clear upon comparing both pressure value graphs, it is understood that the fluctuation in the pressure value of the ink on the upstream side from the discharge head 123 illustrated in FIG. 10C is smaller than the fluctuation illustrated in FIG. 10D, and the fluctuation in the pressure on the upstream side due to the discharge of the ink of the discharge head 123 is suppressed by the accumulator 131. Furthermore, as for the flow rate value of the ink on the upstream side from the discharge head 123, fine amplitude is not observed, as illustrated in FIG. 10C, and it is understood that the flow rate value gradually increases, and after the timing at which the discharge ends, gradually decreases without immediately returning to the flow rate value at the time of non-discharge. As described above, similarly to the case of FIG. 10A, the flow rate value of the ink on the upstream side from the discharge head 123 gradually increases, and after the timing at which the discharge ends, gradually decreases without immediately returning to the flow rate value at the time of non-discharge, but it is confirmed to what extent the discharge amount of the ink by the discharge head 123 is affected. This will be described in detail in FIGS. 11A to 12D.

Furthermore, as becomes clear upon comparing the pressure value and the flow rate value of the ink on the upstream side from the discharge head 123 illustrated in FIG. 10B with the pressure value and the flow rate value of the ink on the upstream side from the discharge head 123 illustrated in FIG. 10D, the fluctuation in the pressure value and the flow rate value of the ink on the upstream side from the discharge head 123 illustrated in FIG. 10B is smaller than the fluctuation illustrated in FIG. 10D, and it is understood that the fluctuation in the pressure and the flow rate on the upstream side due to the discharge of the ink of the discharge head 123 is suppressed in the constant flow-through state.

In the graph illustrated in FIGS. 11A to 11D, as described above, in order to confirm the effect of the behavior of the flow rate of the ink on the upstream side from the discharge head 123 illustrated in FIGS. 10A and 10C on the discharge amount of the ink of the discharge head 123, the pressure value (pressure value measured by the pressure gauge 115) and the flow rate value (flow rate value measured by the flow meter 140) of the ink on the upstream side from the discharge head 123 and the pressure value (pressure value measured by the pressure gauge 116) and the flow rate value (flow rate value measured by the flow meter 141) of the ink on the downstream side in a case where ink discharged continuously nine times from the discharge head 123 is divided into a first half, a middle half, and a latter half on three occasions are illustrated in chronological order. In addition, in FIGS. 11A to 11D, the conditions of the presence or absence of the accumulator 131 and the presence or absence of the constant flow-through are illustrated in correspondence with the conditions illustrated in FIGS. 10A to 10D.

Figure 11A:
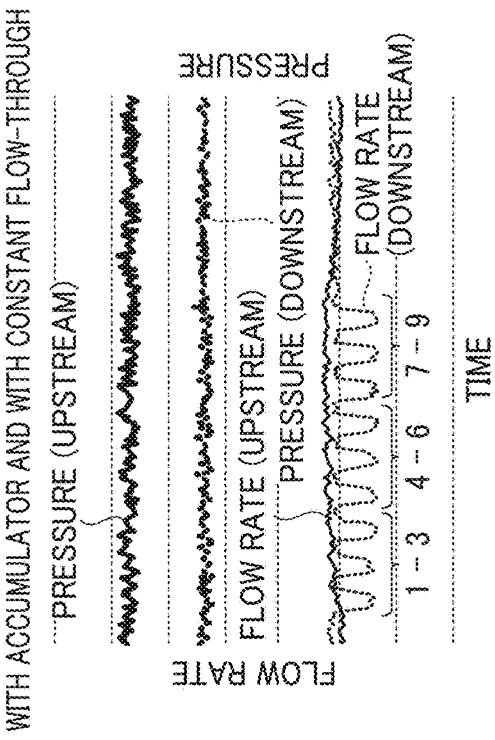
FIGS. 11A to 11D are diagrams illustrating examples of graphs illustrating comparison results of the pressure and the flow rate of the ink on the upstream side and the downstream side from the discharge head according to the presence or absence of the accumulator and the presence or absence of constant flow-through in the ink supply apparatus according to the third embodiment.
Figure 11B:
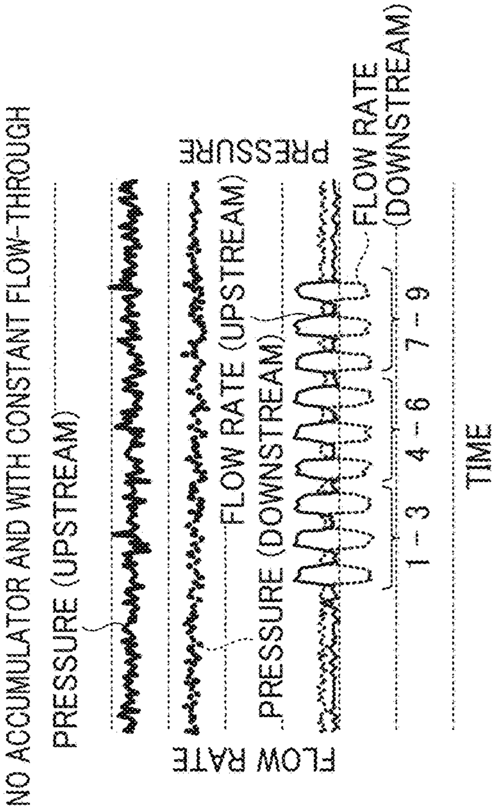

First, the fluctuation in the pressure value of the ink on the upstream side and the downstream side from the discharge head 123 illustrated in FIG. 11A is smaller than the fluctuation illustrated in FIG. 11B, and it is understood that the fluctuation in the pressure due to the discharge of the ink of the discharge head 123 is suppressed by the accumulator 131. Furthermore, the fluctuation of the flow rate value of the ink on the downstream side from the discharge head 123 illustrated in FIG. 11A is smaller than the fluctuation illustrated in FIG. 11B, and it is understood that the fluctuation of the flow rate on the downstream side due to the discharge of the ink of the discharge head 123 is suppressed by the accumulator 131.

Figure 11C:
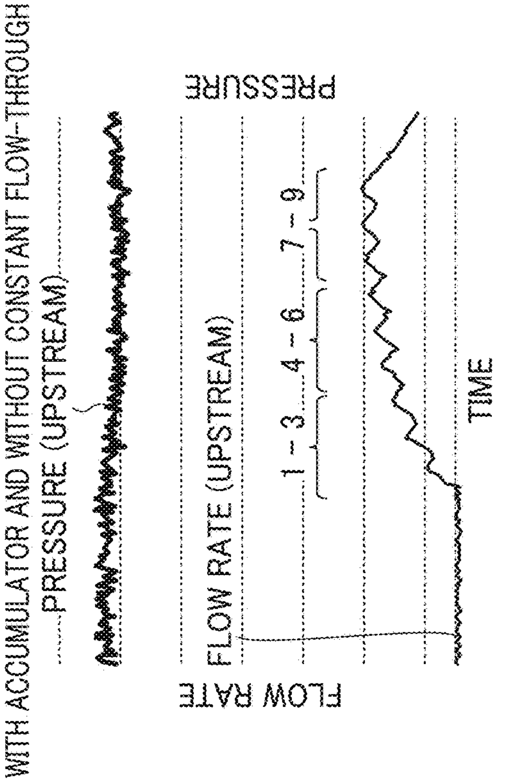
Figure 11D:
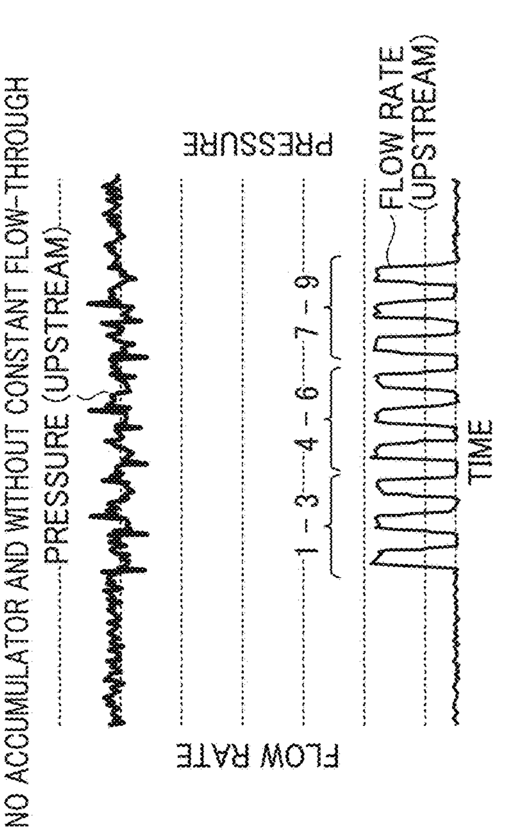
Figure 12A:
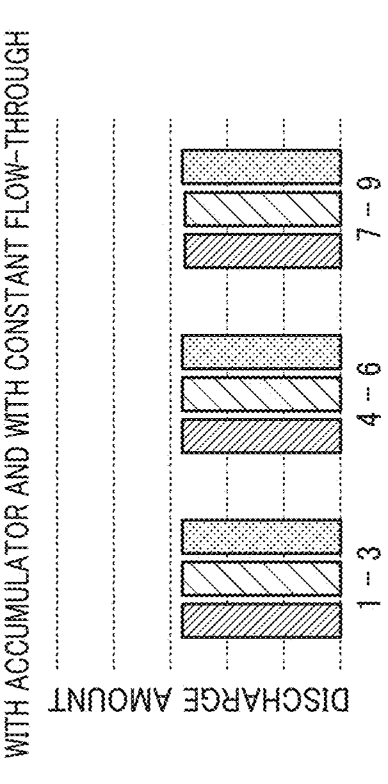
FIGS. 12A to 12D are diagrams illustrating examples of graphs illustrating comparison results of the ink discharge amount of the discharge head according to the presence or absence of the accumulator and the presence or absence of constant flow-through in the ink supply apparatus according to the third embodiment.
Figure 12B:
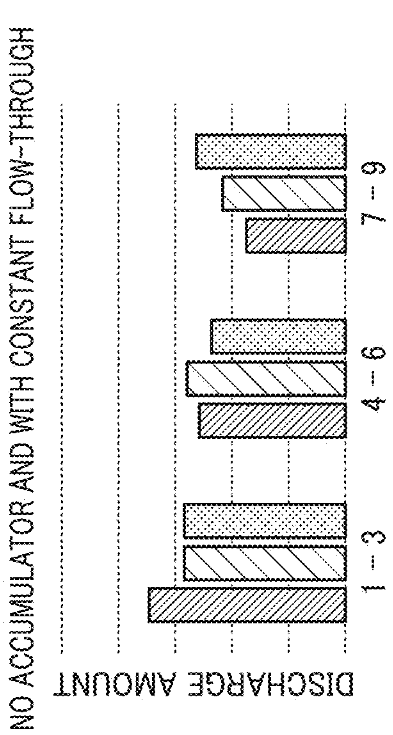
Figure 12C:
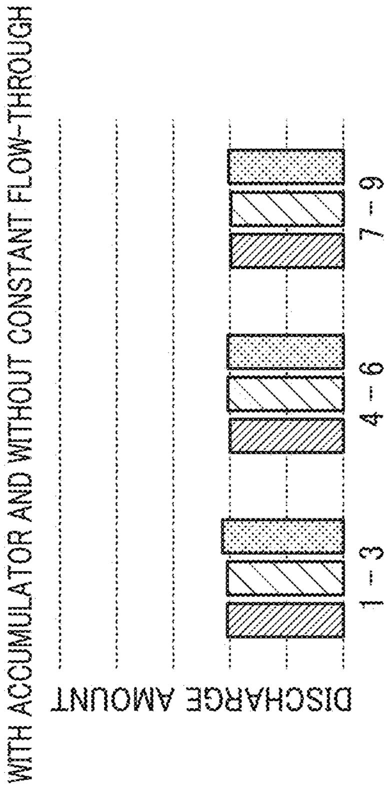
Figure 12D:
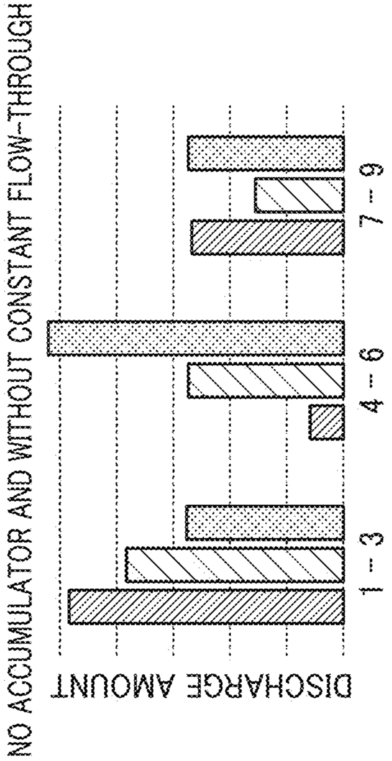

The fluctuation in the pressure value of the ink on the upstream side from the discharge head 123 illustrated in FIG. 11C is smaller than the fluctuation illustrated in FIG. 11D, and it is understood that the fluctuation in the pressure on the upstream side due to the discharge of the ink of the discharge head 123 is suppressed by the accumulator 131.

It is also understood that the fluctuation in the pressure value and the flow rate value of the ink on the upstream side from the discharge head 123 illustrated in FIG. 11B is smaller than the fluctuation illustrated in FIG. 11D, and the fluctuation in the pressure and the flow rate on the upstream side due to the discharge of the ink of the discharge head 123 is suppressed in the constant flow-through state.

Furthermore, in the light of the comparison between FIGS. 12A and 12C and FIGS. 12B and 12D, it is understood that, through the inclusion of the accumulator 131, the discharge amount of the ink discharged from the discharge head 123 is stable even with respect to the steep pressure fluctuation due to the discharge of the ink from the discharge head 123, and it can be estimated that the thixotropy of the ink, which is a non-Newtonian fluid, is exhibited, and that the low viscosity state is maintained. Furthermore, in the light of the comparison between FIGS. 12B and 12D, it is understood that, by setting the state to the constant flow-through state, the discharge amount of the ink discharged from the discharge head 123 is stable even with respect to the steep pressure fluctuation due to the discharge of the ink from the discharge head 123, and it can be estimated that the thixotropy of the ink, which is a non-Newtonian fluid, is exhibited, and that the low viscosity state is maintained.

Furthermore, in the light of the results illustrated in FIGS. 10A to 12D, it is also determined that the ink used by the ink supply apparatus 110*b* according to the present embodiment absorbs the energy which becomes a factor in the changes in pressure and flow rate. This phenomenon is considered to be because the ink is a high-viscosity fluid, and thus acts similarly to a brake with respect to the changes in pressure and flow rate, and absorbs the energy of the fluctuations in pressure and flow rate upon receiving a shear force exhibiting thixotropy and thus likewise acts similarly to a brake.

Note that, because the accumulator 131 is provided and the ink is in the constant flow-through state, the effect of suppressing the fluctuations in the pressure and the flow rate of the ink and the stability of the discharge amount with respect to the steep pressure fluctuation due to the discharge of the ink from the discharge head 123 is exhibited not only in the ink supply apparatus 100*b* according to the present embodiment, but also in the ink supply apparatuses 100 and 100*a* according to the first embodiment and the second embodiment, respectively.

As described above, in the ink supply apparatus 100*b* according to the present embodiment, the pressurizing tank 101 has the air compressed by the high-pressure air supply source 200 supplied thereto and accumulates the ink pressurized by the compressed air, and the accumulated ink is conveyed to the accumulator 131 side, the pressurizing tank 102 supplies the accumulated ink to the pressurizing tank 101, the regulator 111 decompresses the compressed air supplied from the high-pressure air supply source 200 to the pressurizing tank 101 to a first pressure, the regulator 112 decompresses the compressed air supplied from the high-pressure air supply source 200 to the pressurizing tank 102 to a second pressure smaller than the first pressure, the pump 121 conveys the ink accumulated in the pressurizing tank 102 to the pressurizing tank 101, and the discharge head 123 includes an internal flow path through which the ink conveyed from the ink flow path 203 flows, discharges the ink from the internal flow path via nozzles, and the ink flowing out from the internal flow path of the discharge head 123 is conveyed to the pressurizing tank 102 via an ink flow path 204, and the accumulator 131 is installed in the ink flow path 203 at a position downstream from the pressurizing tank 101 and upstream from the discharge head 123, and absorbs the fluctuation in the pressure of the ink flowing through the ink flow path 203, thus configuring a circulation path in which the ink circulates in the ink flow path in the order of the pressurizing tank 101, the accumulator 131, the discharge head 123, the pressurizing tank 102, and the pressurizing tank 101. As a result, fluctuations in the pressure and the flow rate due to the discharge of the ink from the discharge head 123 can be suppressed, and hence the high-viscosity ink (an example of liquid) can be discharged stably and over a distance.

Fourth Embodiment

An ink supply apparatus according to a fourth embodiment will be described by focusing on differences from the ink supply apparatus 100*b* according to the third embodiment. In the present embodiment, a configuration in which an accumulator is also installed at a position downstream from the discharge head 123 will be described.

Figure 13:
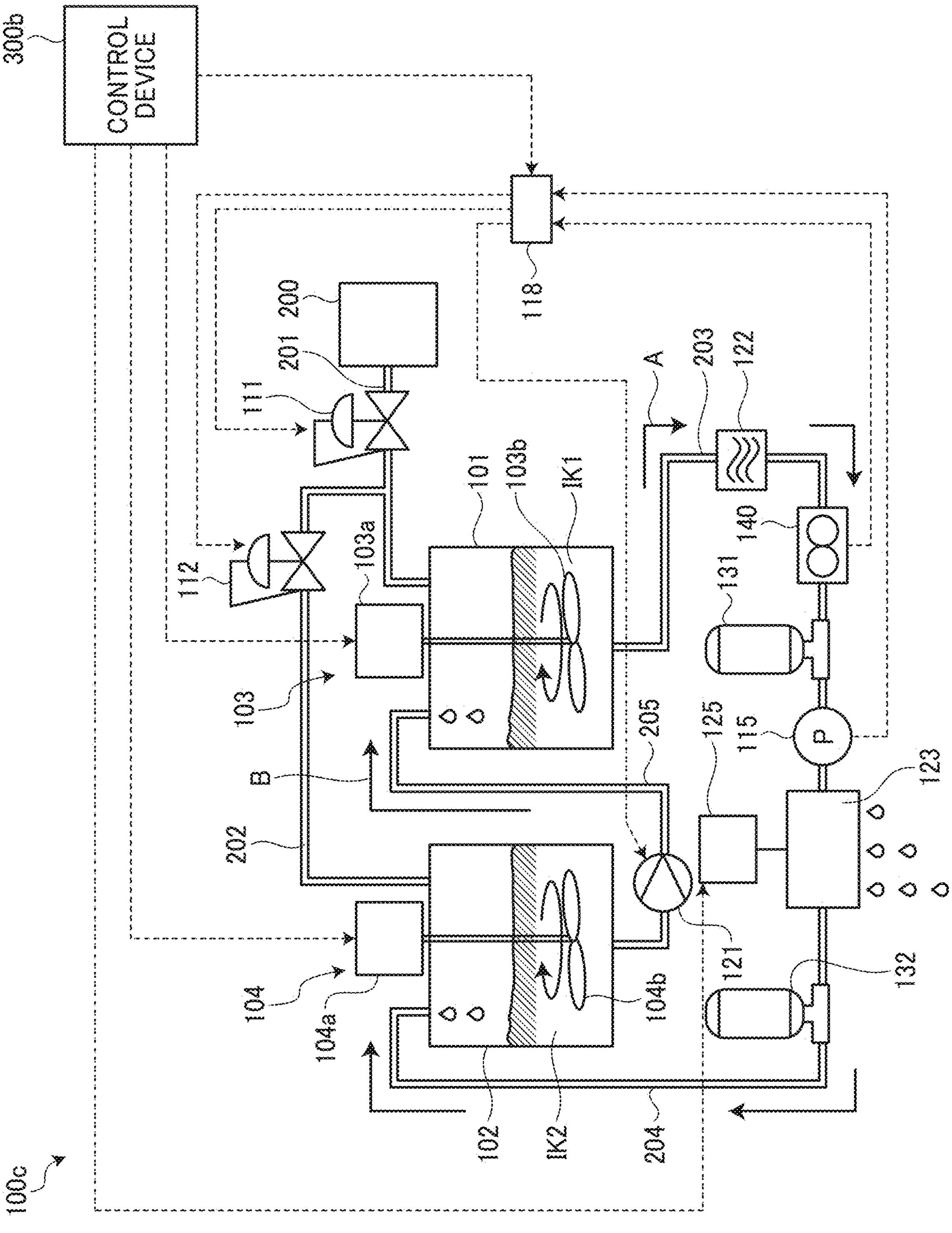
FIG. 13 is a diagram illustrating a configuration of an ink supply apparatus according to a fourth embodiment of the present disclosure.

FIG. 13 is a diagram illustrating a configuration of an ink supply apparatus according to a fourth embodiment of the present disclosure. A configuration of an ink supply apparatus 100*c* according to the present embodiment will be described with reference to FIG. 13.

As illustrated in FIG. 13, the ink supply apparatus 100*c* includes a high-pressure air supply source 200 (compressed air supply source), a regulator 111 (first regulator), a pressurizing tank 101 (first pressurizing tank), a stirring device 103, a regulator 112 (second regulator), a pressurizing tank 102 (second pressurizing tank), a stirring device 104, a pump 121, a filter 122, a flow meter 140, an accumulator 131 (an example of a first mitigation device), a pressure gauge 115, a discharge head 123, a nozzle open-close control device 125, an accumulator 132 (an example of a second mitigation device), a pressure flow rate control device 118 (second control device), and a control device 300*b*. That is, the configuration of the ink supply apparatus 100*c* is similar to the configuration of the ink supply apparatus 100*b* according to the third embodiment described above except that the accumulator 132 is provided.

The accumulator 132 is installed at a position immediately downstream from the discharge head 123 on the ink flow path 204, and is a pressure accumulator that absorbs and compensates for the increase/decrease in the pressure of the ink flowing inside to mitigate the fluctuation in the pressure. The configuration of the accumulator 132 is similar to the configuration of the accumulator 131, and instead of the accumulator 132, the piston pressing mechanism 131-2 (an example of the second mitigation device) illustrated in FIGS. 3A and 3B described above or the subtank 131-3 (an example of the second mitigation device) illustrated in FIGS. 4A and 4B may be used. As a result, similarly to the second embodiment described above, the damper effect can be more uniformly exhibited for all the nozzles of the discharge head 123, and fluctuations in the pressure and the flow rate due to the discharge of the ink from the discharge head 123 can be more effectively suppressed.

Note that the accumulator 132 is desirably installed at a position downstream from the discharge head 123 and as close possible to the discharge head 123 in order to reduce the pressure loss in the flow path.

Fifth Embodiment

An ink supply apparatus according to a fifth embodiment will be described by focusing on differences from the ink supply apparatus 100*b* according to the third embodiment. In the present embodiment, a configuration in which the flow rate control valve 142 is installed at a position downstream from the pressurizing tank 101 on the ink flow path 203 will be described.

Figure 14:
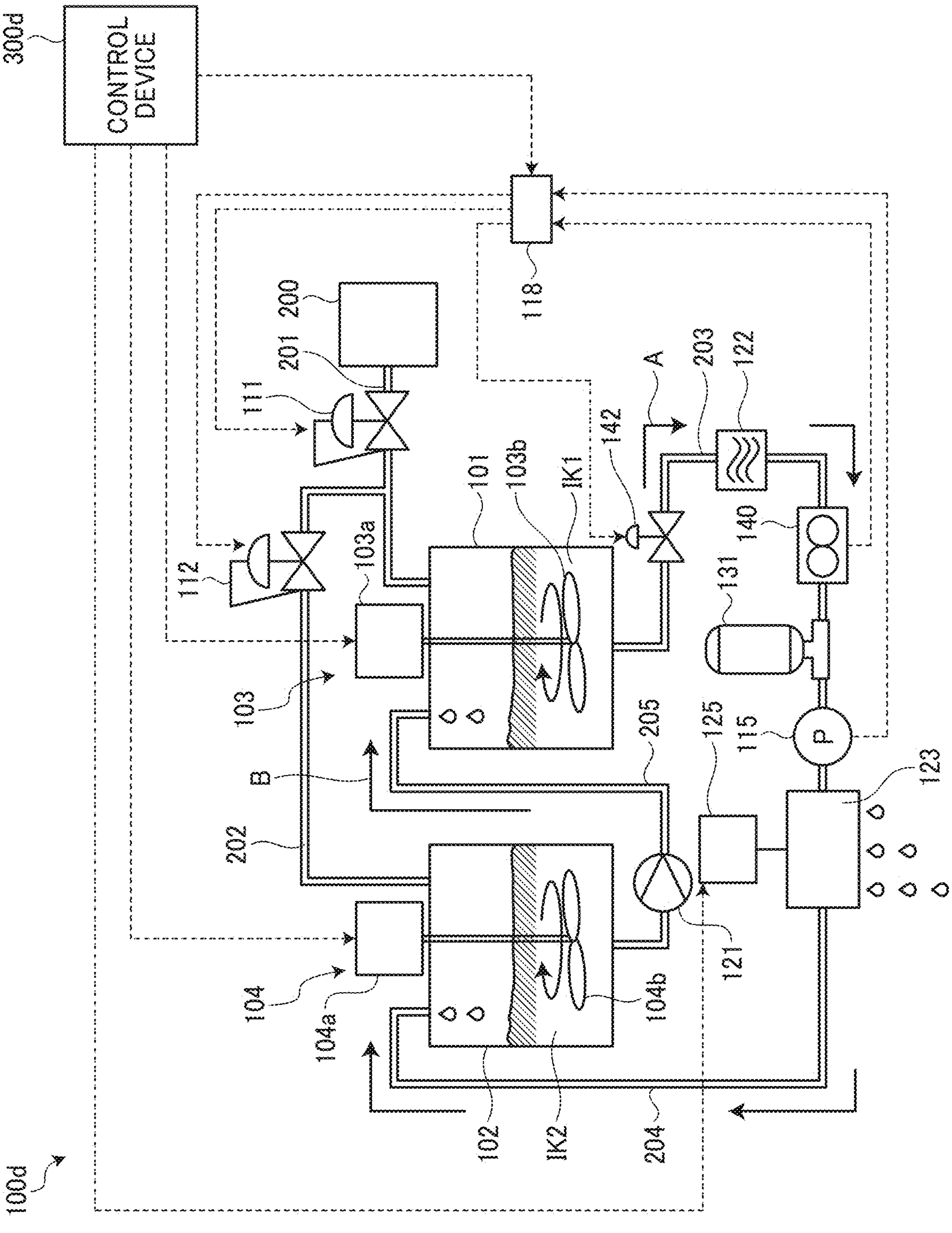
FIG. 14 is a diagram illustrating a configuration of an ink supply apparatus according to a fifth embodiment of the present disclosure.

FIG. 14 is a diagram illustrating a configuration of an ink supply apparatus according to a fifth embodiment of the present disclosure. A configuration of an ink supply apparatus 100*d* according to the present embodiment will be described with reference to FIG. 14.

As illustrated in FIG. 14, the ink supply apparatus 100*d* includes a high-pressure air supply source 200 (compressed air supply source), a regulator 111 (first regulator), a pressurizing tank 101 (first pressurizing tank), a stirring device 103, a regulator 112 (second regulator), a pressurizing tank 102 (second pressurizing tank), a stirring device 104, a pump 121, a flow rate control valve 142, a filter 122, a flow meter 140, an accumulator 131 (an example of a first mitigation device), a pressure gauge 115, a discharge head 123, a nozzle open-close control device 125, a pressure flow rate control device 118 (second control device and third control device), and a control device 300*d*. That is, the configuration of the ink supply apparatus 100*d* is similar to the configuration of the ink supply apparatus 100*b* according to the third embodiment described above except that the flow rate control valve 142 is provided.

The flow rate control valve 142 is installed on the ink flow path 203 at a position downstream from the pressurizing tank 101 and upstream from the accumulator 131, and is a valve device that controls the flow rate of the ink flowing out from the pressurizing tank 101 to the ink flow path 203. The opening degree of the flow rate control valve 142 is controlled by the pressure flow rate control device 118.

The pressure flow rate control device 118 is a device that receives data on the pressure of the ink measured by the pressure gauge 115 and that controls the pressure reduction operation by the regulator 111 and the regulator 112 so that the pressure becomes a given pressure. Furthermore, the pressure flow rate control device 118 performs stable pressure control of the ink by controlling the pressure reduction operation by the regulator 111 and the regulator 112 on the basis of the data on the pressure (discharge pressure) of the ink measured by the pressure gauge 115 when the nozzle of the discharge head 123 is not open, in conjunction with the nozzle open-close control device 125. In this case, the pressure flow rate control device 118 detects the open state of the nozzles of the nozzle open-close control device 125 via the control device 300*d*. Furthermore, the pressure flow rate control device 118 is installed on the ink flow path 203 at a position downstream from the pressurizing tank 101 and upstream from the discharge head 123, and receives data on the flow rate of the ink measured by the flow meter 140, and, on the basis of the data, performs control of the drive time and the speed of rotation of the pump 121 and control of the opening degree of the flow rate control valve 142.

The control device 300*d* is a controller that controls the operation of the whole ink supply apparatus 100*d*. The control device 300*d* performs, for example, on/off control of stirring operations of the stirring device 103 and the stirring device 104, control of the nozzle open-close control device 125, and control of the pressure flow rate control device 118.

As described above, in the ink supply apparatus 100*d* according to the present embodiment, because the pressure flow rate control device 118 stably controls the discharge pressure due to the provision of the flow rate control valve 142, the increase and decrease of the flow rate when the adjustment of the pressure reduction by the regulator 111 and the regulator 112 is freely variable are handled.

Sixth Embodiment

The ink supply apparatus according to a sixth embodiment will be described by focusing on differences from the ink supply apparatus 100*d* according to the fifth embodiment. In the present embodiment, a configuration in which an accumulator is also installed at a position downstream from the discharge head 123 will be described.

Figure 15:
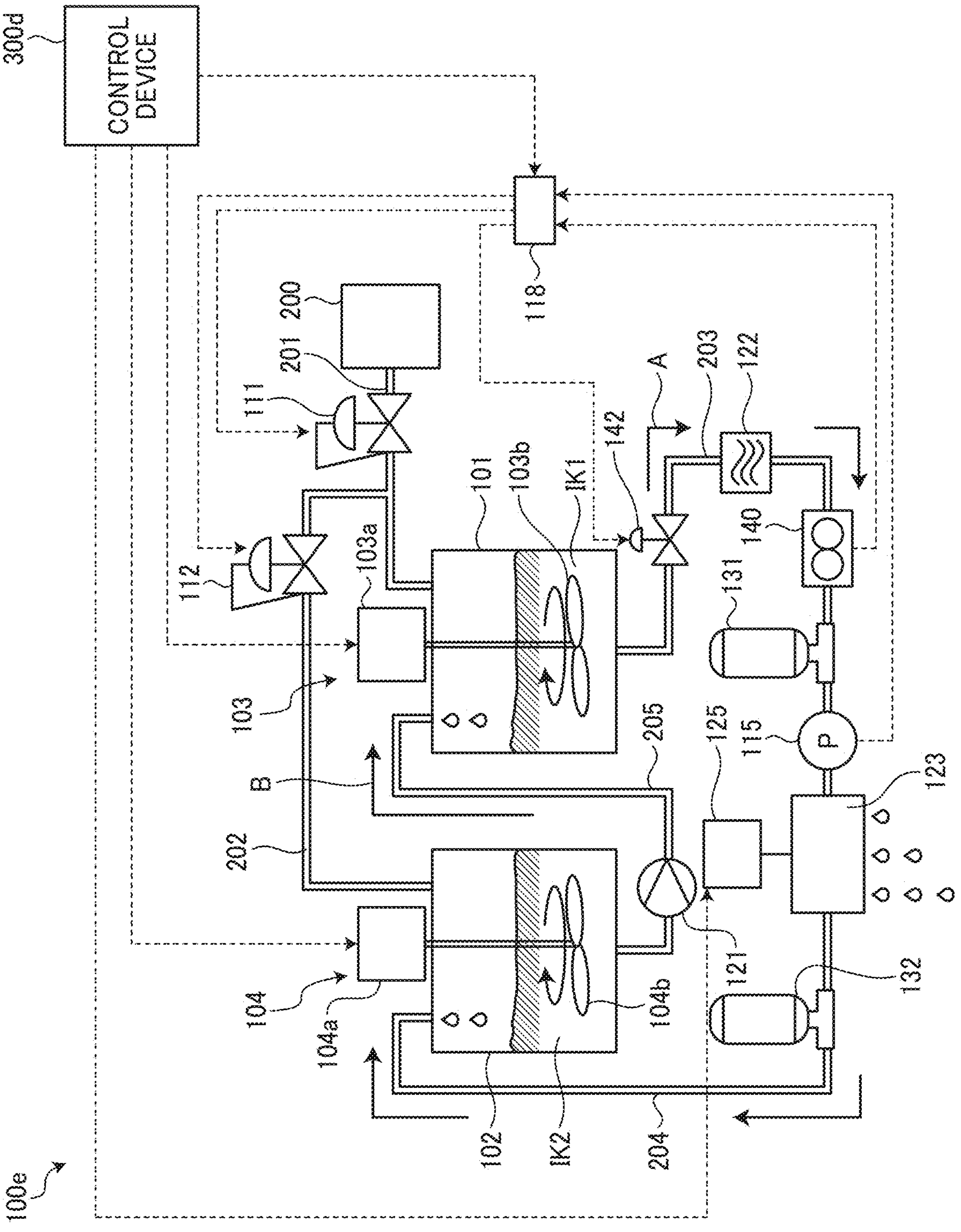
FIG. 15 is a diagram illustrating a configuration of an ink supply apparatus according to a sixth embodiment of the present disclosure.

FIG. 15 is a diagram illustrating a configuration of an ink supply apparatus according to a sixth embodiment of the present disclosure. A configuration of an ink supply apparatus 100*e* according to the present embodiment will be described with reference to FIG. 15.

As illustrated in FIG. 15, the ink supply apparatus 100*e* includes a high-pressure air supply source 200 (compressed air supply source), a regulator 111 (first regulator), a pressurizing tank 101 (first pressurizing tank), a stirring device 103, a regulator 112 (second regulator), a pressurizing tank 102 (second pressurizing tank), a stirring device 104, a pump 121, a flow rate control valve 142, a filter 122, a flow meter 140, an accumulator 131 (an example of a first mitigation device), a pressure gauge 115, a discharge head 123, a nozzle open-close control device 125, an accumulator 132 (an example of a second mitigation device), a pressure flow rate control device 118 (second control device and third control device), and a control device 300*d*. That is, the configuration of the ink supply apparatus 100*e* is similar to the configuration of the ink supply apparatus 100*d* according to the above-described fifth embodiment except that the accumulator 132 is provided.

The accumulator 132 is installed at a position immediately downstream from the discharge head 123 on the ink flow path 204, and is a pressure accumulator that absorbs and compensates for the increase/decrease in the pressure of the ink flowing inside to mitigate the fluctuation in the pressure. The configuration of the accumulator 132 is similar to the configuration of the accumulator 131, and instead of the accumulator 132, the piston pressing mechanism 131-2 (an example of the second mitigation device) illustrated in FIGS. 3A and 3B described above or the subtank 131-3 (an example of the second mitigation device) illustrated in FIGS. 4A and 4B may be used. As a result, similarly to the second embodiment described above, the damper effect can be more uniformly exhibited for all the nozzles of the discharge head 123, and fluctuations in the pressure and the flow rate due to the discharge of the ink from the discharge head 123 can be more effectively suppressed.

Note that the accumulator 132 is desirably installed at a position downstream from the discharge head 123 and as close possible to the discharge head 123 in order to reduce the pressure loss in the flow path.

Seventh Embodiment

In the present embodiment, a configuration of a liquid application apparatus in which the above-described ink supply apparatus 100 is mounted will be described.

Configuration of Liquid Application Apparatus

Figure 16:
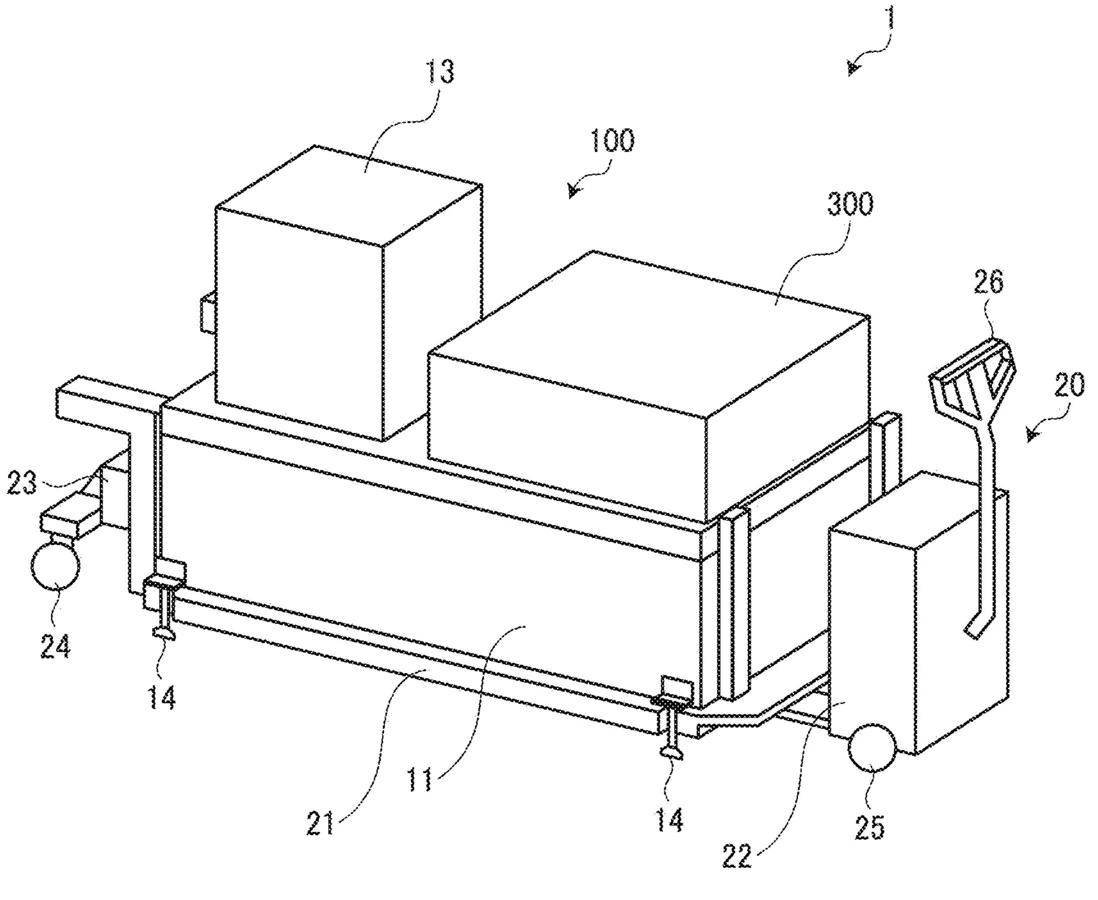
FIG. 16 is an external view of a liquid application apparatus according to a seventh embodiment of the present disclosure.

FIG. 16 is an external view of a liquid application apparatus 1 according to a seventh embodiment of the present disclosure. FIG. 17 is an external view of the liquid application apparatus 1 according to the seventh embodiment with a carriage of a printing device placed at a maintenance position. FIG. 18 is a diagram illustrating a configuration of an ink supply apparatus 100 mounted to the liquid application apparatus 1 according to the seventh embodiment. The overall configuration of the liquid application apparatus 1 according to the present embodiment will be described with reference to FIGS. 16 to 18. In the present embodiment, the configuration in which the liquid application apparatus 1 includes the above-described ink supplying apparatus 100 will be described, but the configuration is not limited thereto. A liquid application apparatus according to an embodiment of the present disclosure may include any of the above-described ink supply apparatuses 100*a* to 100*e*.

The liquid application apparatus 1 illustrated in FIG. 16 is an apparatus that divides a wide liquid application region of an installation surface such as a road surface into a plurality of printing regions, sequentially moves to each printing region, divides printing data for printing on the liquid application region into a plurality of printing images, and prints the printing images. The term “printing” refers to an operation of forming an image by applying or spraying ink to the installation surface. In FIG. 17, a panel on the front side of a housing 11 illustrated in FIG. 17 is drawn is removed to depict the internal structure of the housing 11, which is described later. As illustrated in FIG. 16, the liquid application apparatus 1 includes the ink supply apparatus 100, the housing 11, and a hand truck 20.

In the present embodiment, as illustrated in FIGS. 16 and 18, the ink supply apparatus 100 includes an ink supply mechanism 13, a control device 300, a discharge head 123, a nozzle open-close control device 125, and a pressure gauge 115. Specifically, as illustrated in FIG. 18, the ink supply mechanism 13 includes the components other than the discharge head 123, the pressure gauge 115, the nozzle open-close control device 125, and the control device 300, among the components of the ink supply apparatus 100 illustrated in FIG. 1. The ink supply mechanism 13 is installed on the upper surface of the housing 11 as illustrated in FIG. 16.

The housing 11 is a device that can be carried by the hand truck 20 and performs printing on an installation surface by scanning of a carriage 16 on which the discharge head 123 is mounted. As illustrated in FIGS. 16 and 17, the housing 11 includes four stands 14, the carriage 16, and a maintenance system 16*a*. For example, the ink supply mechanism 13 and the control device 300 are installed on the upper surface of the housing 11.

The stands 14 are support members that are installed at four corners of the bottom of the housing 11 having a rectangular parallelepiped shape as a whole and that support the housing 11 in contact with the installation surface. The number of stands 14 is not limited to four, and may be at least three or more.

As illustrated in FIG. 18, the carriage 16 is a member on which the discharge head 123 that discharges ink, the pressure gauge 115, and the nozzle open-close control device 125 are mounted, and which is scanned in the main scanning direction and the sub-scanning direction by a movement mechanism described later. The scanning of the carriage 16 is controlled by the control device 300. At least one of the pressure gauge 115 and the nozzle open-close control device 125 may be included in the ink supply mechanism 13.

The maintenance system 16*a* is a mechanism that performs a maintenance process such as cleaning of the nozzle surface of the discharge head 123 mounted on the carriage 16. For example, as illustrated in FIG. 17, the control device 300 causes the maintenance system 16*a* to perform the maintenance process in a state where the carriage 16 is moved to a maintenance position 30.

The hand truck 20 is a carrying device that lifts up the housing 11 from the bottom to carry the housing 11 to a printing region. As illustrated in FIG. 16, the hand truck 20 includes a truck frame 21, a lifting device 22, a lifting device 23, front wheels 24, rear wheels 25, and a handle 26.

The truck frame 21 is a frame member having a shape surrounding in a rectangular shape, and is a frame member that supports the housing 11 from the bottom when the housing 11 is raised and lowered.

The lifting device 22 is a device that supports a portion of the housing 11 on one end (rear end) close to the handle 26 and lifts the housing 11 up and down.

The lifting device 23 is a device that supports a portion of the housing 11 on the other end (front end) opposite the one end close to the handle 26 and lifts the housing 11 up and down.

The front wheels 24 and the rear wheels 25 are wheels for moving the hand truck 20 front, back, left, and right.

The handle 26 is a handle member that is attached to the rear end of the hand truck 20 and is gripped by a user (operator). The user can grip the handle 26 to freely move the hand truck 20 front, back, left, and right.

Configuration of Moving Mechanism of Carriage

FIG. 19 is a diagram illustrating a configuration of a moving mechanism of the carriage 16 of the liquid application apparatus 1 according to the seventh embodiment. The configuration of the moving mechanism for scanning the carriage 16 of the liquid application apparatus 1 according to the present embodiment will be described with reference to FIG. 19.

As illustrated in FIG. 19, the housing 11 includes frames **11*a*, a main scanning guide 17, a main scanning motor 17*a*, sub-scanning guides 18, sub-scanning motors 18*a*, and timing belts 18*b* as a moving mechanism for scanning the carriage 16. The moving mechanism is supported by four stands 14 installed on the frame 11*a* constituting a peripheral edge of the bottom of the housing 11**.

The frame **11*a* is a frame member that constitutes four sides of the bottom of the housing 11**.

The main scanning guide 17 is a guide member that extends in the main scanning direction illustrated in FIG. 19 and supports the carriage 16 to be slidable in the main scanning direction.

The main scanning motor **17*a* is a motor for reciprocating the carriage 16 in the main scanning direction along the main scanning guide 17**.

The sub-scanning guides 18 are guide members that are installed on the frames **11*a* each extending in the sub-scanning direction illustrated in FIG. 19 and support the main scanning guide 17 to be slidable in the sub-scanning direction. As illustrated in FIG. 19, the sub-scanning guides 18 are disposed on two frames 11*a* each extending in the sub-scanning direction and facing each other such that the sub-scanning guides 18 support the vicinities of both ends of the main scanning guide 17** extending in the main scanning direction.

The sub-scanning motors **18*a* are motors for reciprocating the main scanning guide 17 in the sub-scanning direction along the sub-scanning guides 18. In this case, the sub-scanning motors 18*a* are rotated to drive pulleys, which are rotated by the sub-scanning motors 18*a*, and the timing belts 18*b* wound around the pulleys rotated by the sub-scanning motors 18*a*. Thus, the main scanning guide 17** reciprocates in the sub-scanning direction.

In this way, the carriage 16 on which the discharge head 123 is mounted can freely move in the main scanning direction and the sub-scanning direction on the plane surrounded by the four frames **11*a***.

With the configuration described above, the liquid application apparatus 1 capable of stably discharging a high-viscosity liquid over a distance can be obtained.

Aspects of the present disclosure are, for example, as follows.

First Aspect

A liquid supply apparatus includes: a pressurizing tank that is supplied with air compressed by a compressed air supply source and that accumulates liquid pressurized by the compressed air; a feeder that feeds the liquid accumulated in the pressurizing tank to a liquid flow path; a discharge head that includes an internal flow path through which the liquid fed from the liquid flow path flows and that discharges the liquid from the internal flow path via a nozzle; and a first mitigation device that is installed on the liquid flow path at a position downstream from the pressurizing tank and upstream from the discharge head and that absorbs a fluctuation in pressure of the liquid flowing through the liquid flow path. The liquid supply apparatus includes a circulation path in which the liquid circulates in the liquid flow path in the order of the pressurizing tank, the first mitigation device, the discharge head, and the pressurizing tank. The feeder circulates the liquid in the circulation path.

Second Aspect

In the liquid supply apparatus according to the first aspect, the feeder circulates the liquid in the circulation path both when the discharge head is discharging the liquid and when the discharge head is not discharging the liquid.

Third Aspect

In the liquid supply apparatus according to the first or second aspect, the feeder is a pump that is installed on the liquid flow path at a position downstream from the pressurizing tank and upstream from the first mitigation device, and that pressure-feeds the liquid in the pressurizing tank toward the first mitigation device and to the liquid flow path.

Fourth Aspect

The liquid supply apparatus according to the third aspect further includes: a pressure gauge that is installed on the liquid flow path at a position downstream from the first mitigation device and upstream from the discharge head and that measures the pressure of the liquid flowing through the liquid flow path; and a first control device that controls the speed of rotation of the pump so that the pressure measured by the pressure gauge be a predetermined value.

Fifth Aspect

In the liquid supply apparatus according to the first or second aspect, the pressurizing tank includes a first pressurizing tank in which accumulated liquid is conveyed toward the first mitigation device by the feeder, and a second pressurizing tank in which accumulated liquid is supplied to the first pressurizing tank.

Sixth Aspect

The liquid supply apparatus according to the fifth aspect further includes a first regulator that reduces the pressure of the compressed air supplied from the compressed air supply source to the first pressurizing tank to a first pressure; a second regulator that reduces the pressure of the compressed air supplied from the compressed air supply source to the second pressurizing tank to a second pressure smaller than the first pressure; and a pump that feeds the liquid accumulated in the second pressurizing tank to the first pressurizing tank.

Seventh Aspect

In the liquid supply apparatus according to the sixth aspect, the liquid flowing out from the internal flow path of the discharge head is conveyed to the second pressurizing tank via the liquid flow path, and the feeder includes the first pressurizing tank, the second pressurizing tank, the first regulator, the second regulator, and the pump, and conveys the liquid accumulated in the first pressurizing tank to the liquid flow path.

Eighth Aspect

The liquid supply apparatus according to the sixth or seventh aspect further includes: a pressure gauge that is installed on the liquid flow path at a position downstream from the first mitigation device and upstream from the discharge head and that measures the pressure of the liquid flowing through the liquid flow path; and a second control device that controls a pressure reduction operation by the first regulator and the second regulator so that the pressure measured by the pressure gauge becomes a predetermined value.

Ninth Aspect

The liquid supply apparatus according to any one of the fifth to seventh aspects further includes: a flow rate control valve that is installed on the liquid flow path at a position downstream from the first pressurizing tank and upstream from the first mitigation device and that controls the flow rate of the liquid on the liquid flow path.

Tenth Aspect

The liquid supply apparatus according to the ninth aspect further includes: a flow meter that is installed on the liquid flow path at a position downstream from the first pressurizing tank and upstream from the discharge head and that measures the flow rate of the liquid flowing through the liquid flow path; and a third control device that controls an opening degree of the flow rate control valve on the basis of the flow rate measured by the flow meter.

Eleventh Aspect

The liquid supply apparatus according to any one of the first to tenth aspects further includes a second mitigation device that is installed on the liquid flow path at a position downstream from the discharge head and upstream from the pressurizing tank and that absorbs the fluctuation in pressure of the liquid flowing through the liquid flow path.

Twelfth Aspect

In the liquid supply apparatus according to any one of the first to eleventh aspects, the first mitigation device is a piston pressing mechanism that includes an accumulator, a subtank, or a shock absorber.

Thirteenth Aspect

In the liquid supply apparatus according to the eleventh aspect, the second mitigation device is a piston pressing mechanism that includes an accumulator, a subtank, or a shock absorber.

Fourteenth Aspect

The liquid supply apparatus according to any one of the first to thirteenth aspects, the discharge head is an inkjet head that operates a needle using an actuator to open and close a nozzle.

Fifteenth Aspect

The liquid supply apparatus according to the third, sixth, or seventh aspect, the pump is a diaphragm pump.

Sixteenth Aspect

In the liquid supply apparatus according to any one of the first to fifteenth aspects, the pressurizing tank is supplied with air compressed by the compressed air supply source to a pressure equal to or greater than atmospheric pressure.

Seventeenth Aspect

A liquid application apparatus, comprising: a liquid supply apparatus to discharge liquid onto an installation surface; a carrying device to move the liquid supply apparatus; and a support to support the liquid supply apparatus. The liquid supply apparatus includes: a pressurizing tank that is supplied with air compressed by a compressed air supply source and that accumulates liquid pressurized by the compressed air; a feeder that feeds the liquid accumulated in the pressurizing tank to a liquid flow path; a discharge head that includes an internal flow path through which the liquid fed from the liquid flow path flows and that discharges the liquid from the internal flow path via a nozzle; and a first mitigation device that is installed on the liquid flow path at a position downstream from the pressurizing tank and upstream from the discharge head and that absorbs a fluctuation in pressure of the liquid flowing through the liquid flow path. The liquid supply apparatus includes a circulation path in which the liquid circulates in the liquid flow path in the order of the pressurizing tank, the first mitigation device, the discharge head, and the pressurizing tank. The feeder circulates the liquid in the circulation path.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid supply apparatus comprising:

a compressed air supply source to compress air;

a pressurizing tank to be supplied with the compressed air from the compressed air supply source and accumulate liquid pressurized by the compressed air;

a feeder to feed the liquid accumulated in the pressurizing tank to a liquid flow path;

a discharge head including an internal flow path through which the liquid fed from the liquid flow path flows, the discharge head having a nozzle to discharge the liquid from the internal flow path;

a mitigator on the liquid flow path at a position downstream from the pressurizing tank and upstream from the discharge head, the mitigator to absorb a fluctuation in pressure of the liquid flowing through the liquid flow path; and a circulation path in which the feeder circulates the liquid in the liquid flow path in an order of the pressurizing tank, the mitigator, the discharge head, and the pressurizing tank, wherein the mitigator is a piston presser that includes an accumulator, a subtank, or a shock absorber.

2. The liquid supply apparatus according to claim 1, wherein:

the feeder circulates the liquid in the circulation path both when the discharge head is discharging the liquid and when the discharge head is not discharging the liquid.

3. The liquid supply apparatus according to claim 1, wherein:

the feeder is a pump that is on the liquid flow path at a position downstream from the pressurizing tank and upstream from the mitigator, to pressure-feed the liquid in the pressurizing tank toward the mitigator and to the liquid flow path.

4. The liquid supply apparatus according to claim 3, further comprising:

a pressure gauge that is on the liquid flow path at a position downstream from the mitigator and upstream from the discharge head, to measure the pressure of the liquid flowing through the liquid flow path; and control circuitry configured to control speed of rotation of the pump so that a pressure measured by the pressure gauge be a predetermined value.

5. The liquid supply apparatus according to claim 3, wherein:

the pump is a diaphragm pump.

6. The liquid supply apparatus according to claim 3, further comprising:

a filter on the liquid flow path at a position downstream from the pump and upstream from the mitigator, to remove foreign matter from the liquid.

7. The liquid supply apparatus according to claim 1, wherein:

the pressurizing tank includes a first pressurizing tank from which accumulated liquid is fed toward the mitigator by the feeder, and a second pressurizing tank from which accumulated liquid is supplied to the first pressurizing tank.

8. The liquid supply apparatus according to claim 7, further comprising:

a first regulator to reduce a pressure of the compressed air supplied from the compressed air supply source to the first pressurizing tank to a first pressure;

a second regulator to reduce a pressure of the compressed air supplied from the compressed air supply source to the second pressurizing tank to a second pressure smaller than the first pressure; and a pump to convey the liquid accumulated in the second pressurizing tank to the first pressurizing tank.

9. The liquid supply apparatus according to claim 8, wherein:

the liquid flowing out from the internal flow path of the discharge head is conveyed to the second pressurizing tank via the liquid flow path, and the feeder includes the first pressurizing tank, the second pressurizing tank, the first regulator, the second regulator, and the pump, to feed the liquid accumulated in the first pressurizing tank to the liquid flow path.

10. The liquid supply apparatus according to claim 8, further comprising:

a pressure gauge on the liquid flow path at a position downstream from the mitigator and upstream from the discharge head, to measure the pressure of the liquid flowing through the liquid flow path; and control circuitry configured to control a pressure reduction operation by the first regulator and the second regulator so that the pressure measured by the pressure gauge be a predetermined value.

11. The liquid supply apparatus according to claim 7, further comprising:

a flow rate control valve on the liquid flow path at a position downstream from the first pressurizing tank and upstream from the mitigator, to control the flow rate of the liquid on the liquid flow path.

12. The liquid supply apparatus according to claim 11, further comprising:

a flow meter on the liquid flow path at a position downstream from the first pressurizing tank and upstream from the discharge head, to measure the flow rate of the liquid flowing through the liquid flow path; and control circuitry configured to control an opening degree of the flow rate control valve on a basis of the flow rate measured by the flow meter.

13. The liquid supply apparatus according to claim 1, further comprising:

another mitigator on the liquid flow path at a position downstream from the discharge head and upstream from the pressurizing tank, to absorb the fluctuation in pressure of the liquid flowing through the liquid flow path.

14. The liquid supply apparatus according to claim 13, wherein:

said another mitigator is a piston presser that includes an accumulator, a subtank, or a shock absorber.

15. The liquid supply apparatus according to claim 13, wherein:

said another mitigator is immediately downstream from the discharge head on the liquid flow path.

16. The liquid supply apparatus according to claim 1, wherein:

the discharge head is an inkjet head to operate a needle using an actuator to open and close the nozzle.

17. The liquid supply apparatus according to claim 1, wherein:

the pressurizing tank is supplied with air compressed by the compressed air supply source to a pressure equal to or greater than atmospheric pressure.

18. The liquid supply apparatus according to claim 1, further comprising:

a stirrer disposed within the pressurizing tank to stir the liquid accumulated therein.

19. A liquid application apparatus, comprising:

a liquid supply apparatus to discharge liquid onto an installation surface;

a carrying device to move the liquid supply apparatus; and a support to support the liquid supply apparatus, the liquid supply apparatus including:

a compressed air supply source to compress air;

a pressurizing tank to be supplied with the compressed air compressed by a compressed air supply source and accumulate liquid pressurized by the compressed air;

a feeder to feed the liquid accumulated in the pressurizing tank to a liquid flow path;

a discharge head including an internal flow path through which the liquid fed from the liquid flow path flows, the discharge head having a nozzle to discharge the liquid from the internal flow path;

a mitigator on the liquid flow path at a position downstream from the pressurizing tank and upstream from the discharge head, the mitigator to absorb a fluctuation in pressure of the liquid flowing through the liquid flow path; and a circulation path in which the feeder circulates the liquid in the liquid flow path in an order of the pressurizing tank, the mitigator, the discharge head, and the pressurizing tank, wherein the mitigator is a piston presser that includes an accumulator, a subtank, or a shock absorber.

20. A liquid supply apparatus comprising:

a compressed air supply source to compress air;

a pressurizing tank to be supplied with the compressed air from the compressed air supply source and accumulate liquid pressurized by the compressed air;

a feeder to feed the liquid accumulated in the pressurizing tank to a liquid flow path;

a discharge head including an internal flow path through which the liquid fed from the liquid flow path flows, the discharge head having a nozzle to discharge the liquid from the internal flow path;

a mitigator on the liquid flow path at a position downstream from the pressurizing tank and upstream from the discharge head, the mitigator to absorb a fluctuation in pressure of the liquid flowing through the liquid flow path;

a circulation path in which the feeder circulates the liquid in the liquid flow path in an order of the pressurizing tank, the mitigator, the discharge head, and the pressurizing tank; and another mitigator on the liquid flow path at a position downstream from the discharge head and upstream from the pressurizing tank, to absorb the fluctuation in pressure of the liquid flowing through the liquid flow path, wherein said another mitigator is a piston presser that includes an accumulator, a subtank, or a shock absorber.

* * * * *